United States Patent [19]

McMillen et al.

[11] Patent Number: 4,630,258

[45] Date of Patent: Dec. 16, 1986

[54] PACKET SWITCHED MULTIPORT MEMORY NXM SWITCH NODE AND PROCESSING METHOD

[75] Inventors: Robert J. McMillen, Long Beach; Andrew Rosman, Los Alamitos, both of Calif.

[73] Assignee: Hughes Aircraft Company, Los Angeles, Calif.

[21] Appl. No.: 661,996

[22] Filed: Oct. 18, 1984

[51] Int. Cl.[4] .......................... H04Q 11/04; H04J 3/24
[52] U.S. Cl. .......................................... 370/60; 370/94
[58] Field of Search ........................ 370/60, 94, 58, 61, 370/68; 340/825.5, 825.51

[56] References Cited

U.S. PATENT DOCUMENTS

| | | | |
|---|---|---|---|
| 3,629,846 | 12/1971 | Thompson | 370/68 |
| 3,962,706 | 6/1976 | Dennis et al. | |
| 3,979,733 | 9/1976 | Fraser | 370/60 |
| 4,074,233 | 2/1978 | Swain | 340/825.51 |
| 4,128,882 | 12/1978 | Dennis | |
| 4,130,885 | 12/1978 | Dennis | |
| 4,145,733 | 3/1979 | Misunas et al. | |
| 4,149,240 | 4/1979 | Misunas et al. | |
| 4,153,932 | 5/1979 | Dennis et al. | |
| 4,201,890 | 5/1980 | Lawrence et al. | 370/68 |
| 4,229,790 | 10/1980 | Gilliland et al. | |
| 4,314,233 | 2/1982 | Clark | 370/60 |
| 4,365,292 | 12/1982 | Barnes et al. | |
| 4,450,554 | 5/1984 | Steensma et al. | |

FOREIGN PATENT DOCUMENTS

| | | | |
|---|---|---|---|
| 0014152 | 8/1980 | European Pat. Off. | |
| 0020255 | 12/1980 | European Pat. Off. | |
| 2305907 | 3/1975 | France | 370/60 |
| 2549673 | 1/1985 | France | |
| 59-135953 | 8/1984 | Japan | |
| 8401077 | 3/1984 | PCT Int'l Appl. | |

OTHER PUBLICATIONS

Switching Strategies in a Class of Packet Switching Networks, M. Kumar et al; The 10th Annual International Symposium on Computer Architecture, 1983; Stockholm, Sweden; pp. 284–300.
The Hybrid Cube Network, R. J. McMillen et al; Distributed Data Acquisition, Computing & Control Symposium; Dec. 1980; pp. 11–22.
The Polycyclic Processor, B. G. Chatterjee; IEE International Conference on Computer Design: VLSI-Computers; 1983; pp. 84–87.
The Gamma Network: A Multiprocessor Interconnection Network with Redundant Paths; D. S. Parker and C. S. Raghavendra; The 9th Annual Symposium on Computer Architecture; Sponsored by the IEEE Computer Society and the Association for Computing Machinery; Apr. 26–29, 1982; pp. 73–80.

Primary Examiner—Douglas W. Olms
Assistant Examiner—Wellington Chin
Attorney, Agent, or Firm—Kenneth W. Float; A. W. Karambelas

[57] ABSTRACT

A packet switching node which processes applied data packets containing routing tag signals indicative of the output port destination to which the data packets are to be applied. The invention comprises an N×M switch node that accepts data packets at any of N input ports and routes each to any of M output ports. The output selected is determined by the routing tag signal in the packet. The node comprises a multiport memory having a predetermined number of memory locations available for storage of data packets applied to each of a plurality of input ports. Control logic coupled to the input and output ports and memory is designed so that the data packets are effectively sorted according to their desired output port destination. The control logic comprises arbitration logic which randomly, in a statistical sense, chooses among any data packets that are directed to the same output port. The algorithm implemented by the arbitration logic is designed so that data packets will not wait indefinitely to be routed from the switch node. A method in accordance with the present invention comprises sorting and storing the data packets based upon the output port destination and then arbitrating among the data packets. The final step involves routing the data packets selected during the arbitration processes to the output ports identified in the routing tag signals.

12 Claims, 25 Drawing Figures

OTHER PUBLICATIONS

Multi-Microprocessor Based Architecture for a Space Borne Packet Switch; P. N. Jean, S. C. Crist, M. Arozullah; Concom 80, 20th IEEE Computer Society International Conference (San Francisco, U.S.); Feb. 25-28, 1980; pp. 139-142.

Message-Switching Networks with Alternate Routing; U. Herzog; Proceedings of the International Teletraffic Congress; Stockholm; Proc. 7, Part 2, Swedish Communications 173 (Stockholm, Sweden).

A Parallel Processor for Evaluation Studies; G. J. Nutt; American Federation of Information Processing Soc., Joint Computer Conference, 1976; vol. 45: Proceedings of the National Computer Conference, New York, Jun. 7-10, 1976; pp. 769-775.

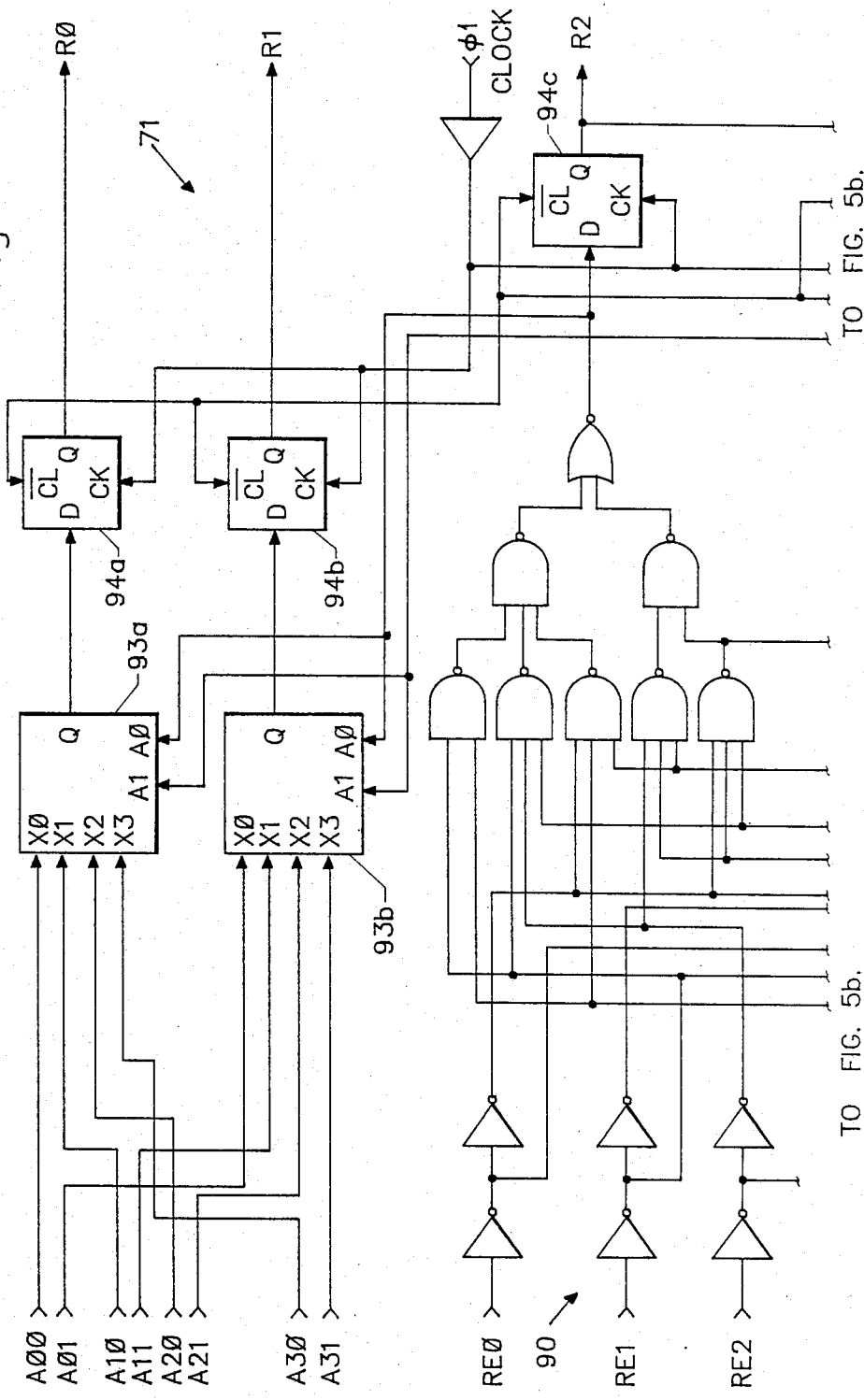

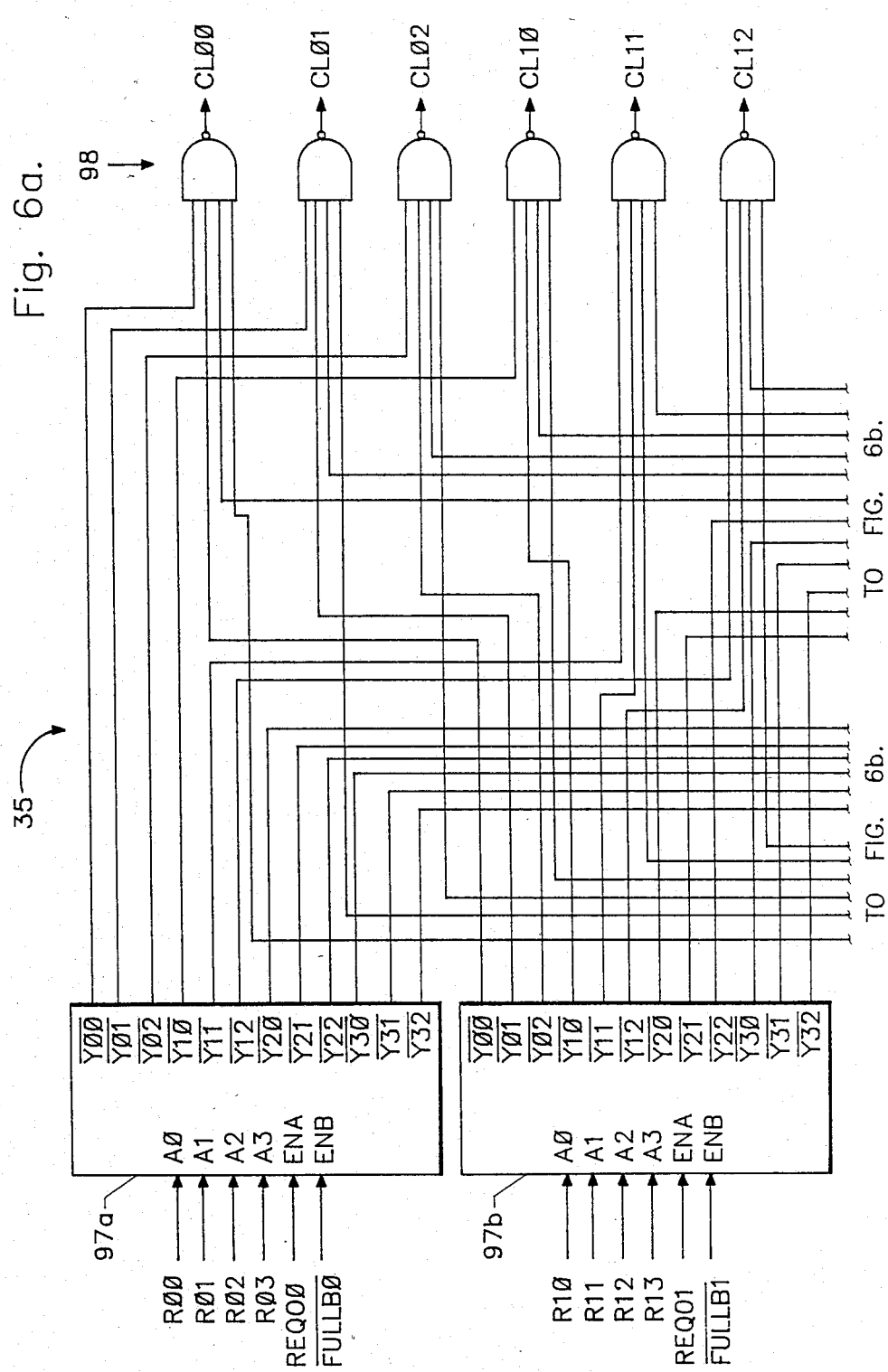

PACKET SWITCHED MULTIPORT MEMORY NXM SWITCH NODE AND PROCESSING METHOD

BACKGROUND OF THE INVENTION

The present invention relates generally to packet switching networks employed in multi-processor and parallel computer systems, and digital communications systems, and the like, and more particularly to packet switching nodes which employ a multiport memory and control logic coupled thereto which is employed to store and forward data packets to a plurality of output ports and which reduces output port contention among data packets arriving at the same input port.

One developing area of computer technology involves the design and development of large-scale, multi-processor-based distributed and parallel computer systems. Typical of these classes of computer systems and architectural approaches are the single instruction stream, multiple data stream (SIMD) computer architecture and the mutiple instruction stream, multiple data stream (MIMD) computer architecture.

A SIMD computer typically comprises a control unit, N processors, N memory modules and an interconnection network. The control unit broadcasts instructions to all of the processors, and all active processors execute the same instruction at the same time. Each active processor executes the instruction on data in its own associated memory module. The interconnection network provides a communications facility for the processors and memory modules.

A MIMD computer typically comprises N processors and N memories, and each processor can execute an independent instruction stream. Each of the processors may communicate to any other processor. Similar interconnection networks may be employed in the MIMD computer.

Various interconnection networks may be employed to interconnect processors and memories employed in either type of computer system. These interconnection networks include delta networks, omega networks, indirect binary n-cube networks, flip networks, cube networks and banyan networks, for example.

The above-cited networks are discused in some detail in the following publications: "LSI implementation of modular interconnection networks for MIMD machines," 1980 *Int'l. Conf. Parallel Processing*, Aug. 1980, pp. 161-162; "Analysis and simulation of buffered delta networks," *IEEE Trans. Computers*, Vol. C-30, pp. 273-282, April 1981; "Processor-memory interconnections for multiprocessors," *6th Annual Int'l. Symp. Computer Architecture*, April 1979, pp. 168-177; "Design and implementation of the banyan interconnection network in TRAC," *AFIPS* 1980 *Nat'l. Computer Conf.*, June 1980, pp. 643-653; "The multistage cube: a versatile interconnection network," *Computer*, Vol. 14, pp. 65-76, Dec. 1981; "The hybrid cube network," *Distributed Data Acquisition, Computing and Control Symp.*, Dec. 1980, pp. 11-22; and "Performance and implementation of 4×4 switching nodes in an interconnection network for PASM," 1981 *Int'l Conf. on Parallel Processing*, Aug. 1981, pp. 229-233.

Several types of data switching techniques may be employed to transfer data in SIMD and MIMD computers, and the like, including packet switching, message switching, time-division circuit switching or space-division circuit switching. Packet switching involves sending one or more words of data at a time through the system.

Conventional packet switching interconnection networks and nodes have a well-known problem involving the speed of transmission of information through the network. Conventional designs have typically employed a single queue coupled to each input port of the network to store and forward signal packets to all the output ports. In the single queue system, a contention problem occurs due to the fact that a signal packet destined for output port 2, for example, is blocked from exiting through that port because a signal packet destined for output port 1 is physically ahead of it in the queue and has not yet exited through port 1. This contention problem causes unnecessary transport delays and thus reduces system throughput.

One packet switching node which attempts to overcome this problem is described in a presently copending patent application entitled "Packet switched multiple queue N×M switch node," invented by R. J. McMillen and assigned to the assignee of the present invention. This invention utilizes a plurality of queue sets individually connected to each of the input ports in order to sort the signal packets according to output port destination. However, although this node improves the communications capability of computer systems employing it, it requires a large buffering capacity. This implies the use of a large number of storage transistors in the logic circuitry.

SUMMARY OF THE INVENTION

In order to overcome the limitations of prior art switching node designs, the present invention provides for a packet switching node which processes applied data packets containing routing tag signals indicative of the output port destination to which the data packets are to be applied. The packet switching node comprises a plurality of input ports and a plurality of output ports. A multiport memory is coupled between the input and output ports. The memory has a predetermined number of memory locations available for storage of data packets applied to each of the input ports. Control logic is coupled to the input and output ports and the multiport memory which controls the storage of data packets in the memory. The control logic also controls the routing of the data packets to the output ports in accordance with the routing tag signals.

The control logic comprises status register logic coupled to the input ports and the memory for storing both the routing tag signals and status signals indicative of the full/empty status of each of the memory locations in the memory. The control logic also includes priority encoder logic coupled to the input ports, the memory and the status register logic. The priority encoder logic monitors the full/empty status of the memory locations, writes the routing tag signals into registers of the status register logic and writes data packets corresponding to the routing tag signals into selected memory locations.

The control logic further comprises arbitration logic coupled to the status register, the memory and the output ports. The arbitration logic transfers the data packets from the memory locations to the output ports identified in the corresponding routing tag signals based upon a predetermined priority arbitration scheme. In arbitration logic includes buffer arbitration logic which arbitrates among routing tags entering the same input port that contend for output from the same output port.

The arbitration logic randomly, in a statistical sense and over a period of time, selects a particular routing tag therefrom. In addition, port arbitration logic is coupled to the buffer arbitration logic which arbitrates among all routing tags transmitted by the buffer arbitration logic which contend for the same output port and selects one routing tag therefrom for output from that particular output port. This port arbitration is done simultaneously for all output ports.

The arbitration logic also includes address generation and latch logic which generates read addresses that control the output of data packets through the appropriate output port for data packets corresponding to those routing tag signals selected by the port arbitration logic. Status update logic coupled to the latch logic generates signals which reset the full/empty status of the registers corresponding to the data packets applied to any of the output ports.

In general, the present invention comprises an N×M switch node that accepts data packets at any of N input ports and routes each to any of M output ports. The output selected is determined by the routing tag signal in the packet. The control logic is designed so that the data packets are effectively sorted according to their desired output port destination. The arbitration logic randomly, in a statistical sense, chooses among any data packets that are directed to the same output port. The algorithm implemented by the arbitration logic is designed so that data packets will not wait indefinitely to be routed from the switch node.

In operation, the control logic performs handshaking with other switch nodes or processors, or the like, to which it is connected. The control logic generates addresses into the memory and arbitrates among data packets. All incoming requests to the switch node are accompanied by the routing tag signals. These routing tag signals are a predetermined number of bits in the data packet. These bits, along with a full/empty status bit, are stored in the status register logic. The status register has N×P cells, where N is the number of input ports and P is the number of storage locations allowed per input port. Each cell corresponds to a memory location in the multiport memory and stores both the status and tag bits corresponding to the data packet stored in a particular memory location.

The priority encoder logic selects the first available cell allotted for a given input port when a request is received. As long as the status bits associated with a particular input port are not all full, a grant signal is sent to the sending node or node. The requesting packet is then written into its assigned location in memory, the tag bits are written into the status register and the corresponding full/empty bit is set to "full".

Arbitration among packets takes place in two steps. First, all the tag bits in full cells are decoded and grouped according to the desired output port. Then the buffer arbitration logic randomly chooses among packets that entered the same input port that also are destined for the same output port. In the second step, the port arbitration logic randomly chooses between any packets selected for further arbitration by the buffer arbitration logic that are destined for the same output port. An important feature of the arbitration scheme is that as long as data packets that entered the same input port want different output ports, all are allowed to participate in the second step of arbitration. Thus, none are blocked due to their position in memory. A packet can only be blocked due to competition with another packet for the same output port.

Finally, the results of the arbitration process are latched and requests are generated for those output ports desired by packets. Appropriate read addresses are generated for each output port that is to be used. For those requests that are granted, the appropriate full/empty status bits are reset to "empty." If any request is not granted, the packet remains in memory and repeats the arbitration process during the next cycle.

Thus, the packet switching node of the present invention eliminates the problem of contention among data packets arriving at any of its input ports whose destinations are different output ports. The packet switching node sorts applied data packets according to output port destination to reduce contention, and thus improve system performance and throughput.

Although the present invention is described with particular reference to its use with computer systems and architectures, it is not limited to this application. The present invention may also be used in applications involving the communications field. In particular, interconnection networks employing the present invention may be used to route digitized voice and/or data packets between subscribers of a telephone network. The data packets would be sent by computers or other similar equipment co-located with the subscriber.

In addition, the present invention contemplates a method of processing applied data packets containing routing tag signals indicative of the output port destinations to which the data packets are to be applied. The method operates to route the data packets to the appropriate output ports, based on the routing tag signals. The method comprises the steps of storing the data packets arriving at each of the input ports in predetermined available memory locations. The second step involves selecting among data packets that have entered the same input port which contend for the same output port. The third step involves selecting among data packets that have entered different input ports and have emerged from the first selection process that contend for the same output port. Finally, the last step in the method involves applying the selected data packet to the output port identified in the routing tag signal.

Alternatively, the method comprises the steps of sorting the data packets based upon the output port destination thereof contained in said routing tag signals. Then the method comprises arbitrating among data packets which have entered the same input port and which are destined for the same output port. The method then contemplates arbitrating among all data packets that have entered different input ports and which are destined for the same output port. The final step involves routing the data packets selected during the two arbitration processes to the output ports identified in the routing tag signals.

A third alternative method comprises the steps of storing the data packets in predetermined memory locations. The second step comprises sorting the stored data packets based upon the output port destination thereof contained in the routing tag signals. The third step comprises arbitrating among those data packets which have entered the same input port and which are destined for the same output port. The next step involves arbitrating among data packets that have entered different input ports and which are destined for the same output port. The final step contemplates routing the data packets selected during the arbitration process from the memory locations to the output ports identified in the routing tag signals.

BRIEF DESCRIPTION OF THE DRAWINGS

The various objects and features of the present invention may be more readily understood with reference to the following detailed description taken in conjunction with the accompanying drawings, wherein like reference numerals designate like structural elements, and in which:

FIGS. 5a and 5b show a design of port arbitration and latch logic for use in the control logic of FIG. 3;

FIGS. 6a and 6b show a design of status update (clear) logic used in the control logic of FIG. 3;

DESCRIPTION OF THE PREFERRED EMBODIMENTS

Figure 1:
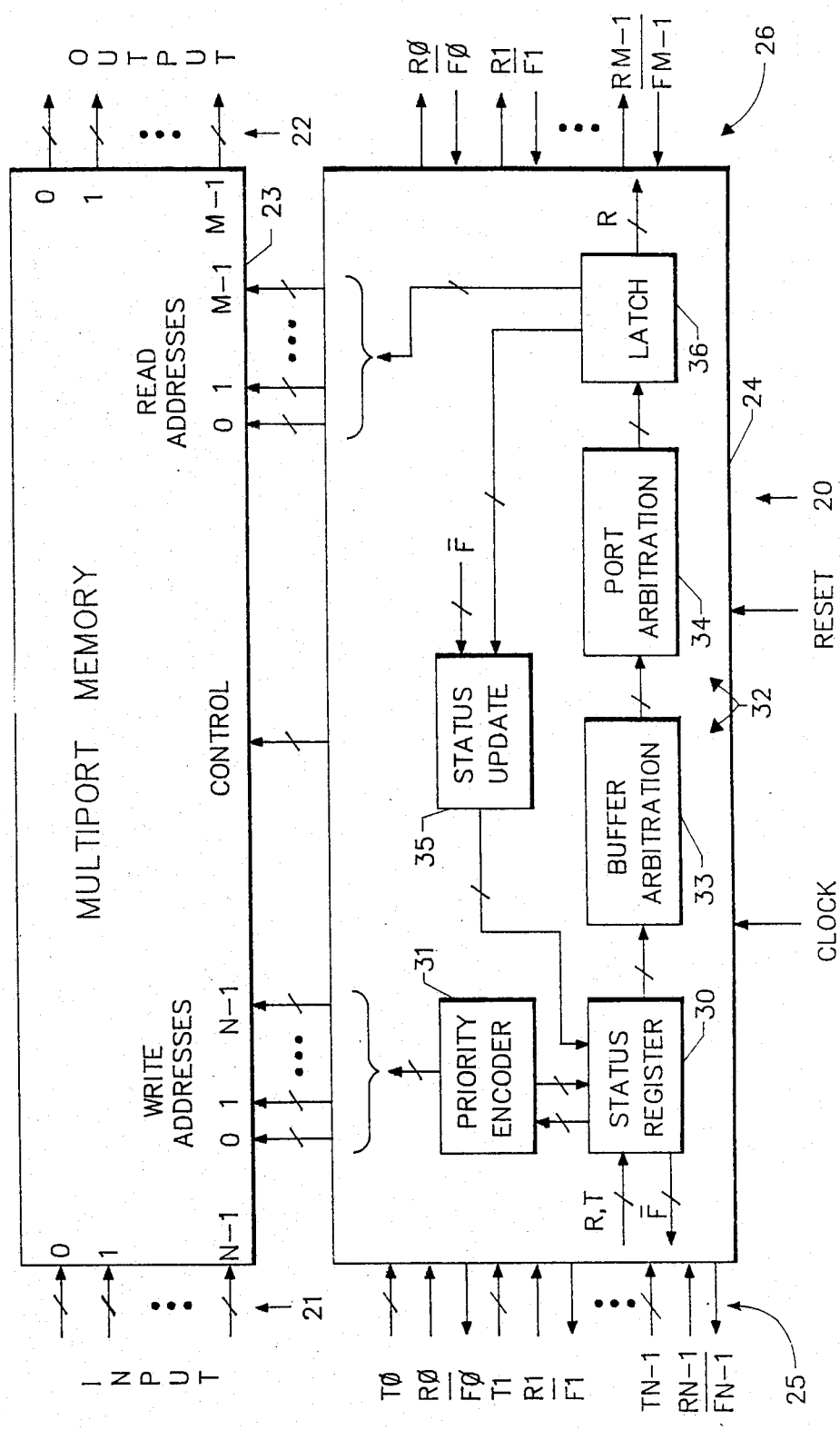
FIG. 1 illustrates a generalized embodiment of an N×M multiport memory packet switching node in accordance with the principles of the present invention.

Referring to FIG. 1, there is shown a generalized embodiment of an N×M multiport memory packet switching node 20 in accordance with the principles of the present invention. The node 20 comprises a plurality of input ports 21 and a plurality of output ports 22. A multiport memory 23 is coupled between the input and output ports 21, 22. The memory 23 has a predetermined number of memory locations available for storage of data packets applied to each of the input ports 21. Control logic 24 is coupled to the input and output ports 21, 22 and the multiport memory 23 which controls the storage of data packets in the memory 23. The control logic 24 also controls the routing of the data packets to the output ports 22 in accordance with routing tag signals contained in the data packets.

The transmission protocol for receiving data packets by way of the input ports 21 is executed by a plurality of receiving handshake signal lines 25 coupled to the control logic 24. Similarly the transmission protocol for sending data packets from the output ports 22 is executed by a plurality of sending handshake signal lines 26 also coupled to the control logic 24.

The control logic 24 comprises tag status logic register 30 coupled to the input ports 21, the receive handshake signal lines 25, and the memory 23, which stores both the routing tag signals and status signals indicative of the full/empty status of each of the memory locations in the memory 23. The control logic 24 also includes priority encoder logic 31 coupled to the input ports 21, the memory 23 and the tag status register logic 30. The priority encoder logic 31 is adapted to monitor the full/empty status of the memory locations, write the routing tag signals into registers of the status register 30 and write data packets corresponding to the routing tag signals into selected memory locations.

The control logic 24 further comprises arbitration logic 32 coupled to the tag status register logic 30 and latch logic 36. The arbitration logic 32 is designed to examine routing tags stored in the status register logic 30 and resolve conflicting requests based upon a predetermined priority arbitration scheme. In the arbitration process, read addresses are generated and stored in the latch logic 36 that determine the output of data packets through the appropriate output port 22 such that they correspond to the routing tag signals selected by the arbitration logic 32.

The arbitration logic 32 includes buffer arbitration logic 33 which is designed to arbitrate among routing tags entering the same input port 21 that contend for output from the same output port 22. The arbitration logic 32 randomly selects a particular routing tag therefrom. In addition, port arbitration logic 34 is coupled to the buffer arbitration logic 33 and to the latch logic 36 which is adapted to arbitrate among all routing tags transmitted by the buffer arbitration logic 33 which contend for the same output port 22 and selects one routing tag and its associated packet therefrom for output from that particular output port 22.

Status update logic 35 is coupled to the latch logic 36 and the sending handshake signal lines 26. The status update logic 35 is designed to generate signals which reset the full/empty status of the registers corresponding to the data packets applied to and transmitted from any of the output ports 22.

In operation, the present invention may be employed as an N×M switch node that accepts data packets at any of N input ports 21 and routes each to any of M output ports 22. The output port 22 selected is determined by the routing tag signal in the data packet. The control logic 24 is designed so that the data packets are effectively sorted according to their desired output port destination. The arbitration logic 32 randomly, in a statistical sense, chooses among data packets that are directed to the same output port 22. The algorithm implemented by the arbitration logic 32 is designed so that data packets will not wait indefinitely to be routed from the switch node 20.

The control logic 24 performs handshaking with other switch nodes or processors, or the like, to which the node 20 is connected. The control logic 24 generates addresses into the memory 23 and arbitrates among data packets. All incoming requests to the switch node 20 are accompanied by the routing tag signals. These routing tag signals are a predetermined number of bits in the data packet. These bits, along with a full/empty status bit, are stored in the tag status register logic 30. The status register logic 30 contains $N \times P$ cells, where N is the number of input ports 21 and P is the number of storage locations allowed per input port 21. Each cell corresponds to a memory location and stores both the status and tag bits.

The priority encoder logic 31 selects the first available cell allotted for a given input port 21 when a request is received. As long as the status bits are not all full, a "not full," or grant signal is sent to the sending node or processor which is interpreted to mean proceed. The requesting packet is then written into its assigned location in the memory 23, the tag bits are written into the tag status register logic 30 and the corresponding full/empty bit is set to "full".

Arbitration among packets takes place in two steps. First, all the tag bits in full cells are decoded and grouped according to the desired output port 22. Then the buffer arbitration locic 33 randomly chooses among packets that entered the same input port 21 that also are destined for the same output port 22. In the second step, the port arbitration logic 34 randomly chooses between any packets presented by the buffer arbitration logic 33 that are destined for the same output port 22. As long as data packets that entered the same input port 21 are destined for different output ports 22, all are allowed to participate in the second step of arbitration. Thus, none are blocked due to their position in the memory 23. A packet can only be blocked due to competition with another packet for the same output port 22.

The results of the arbitration process are latched in the latch logic 36 and requests are generated for those output ports 22 desired by the data packets. Appropriate read addresses are generated for each output port 22 that is to be used. For those requests that are granted, the appropriate full/empty status bits are reset to "empty." If any request is not granted, the packet remains in the memory 23 and repeats the arbitration process during the next cycle.

Figure 2:
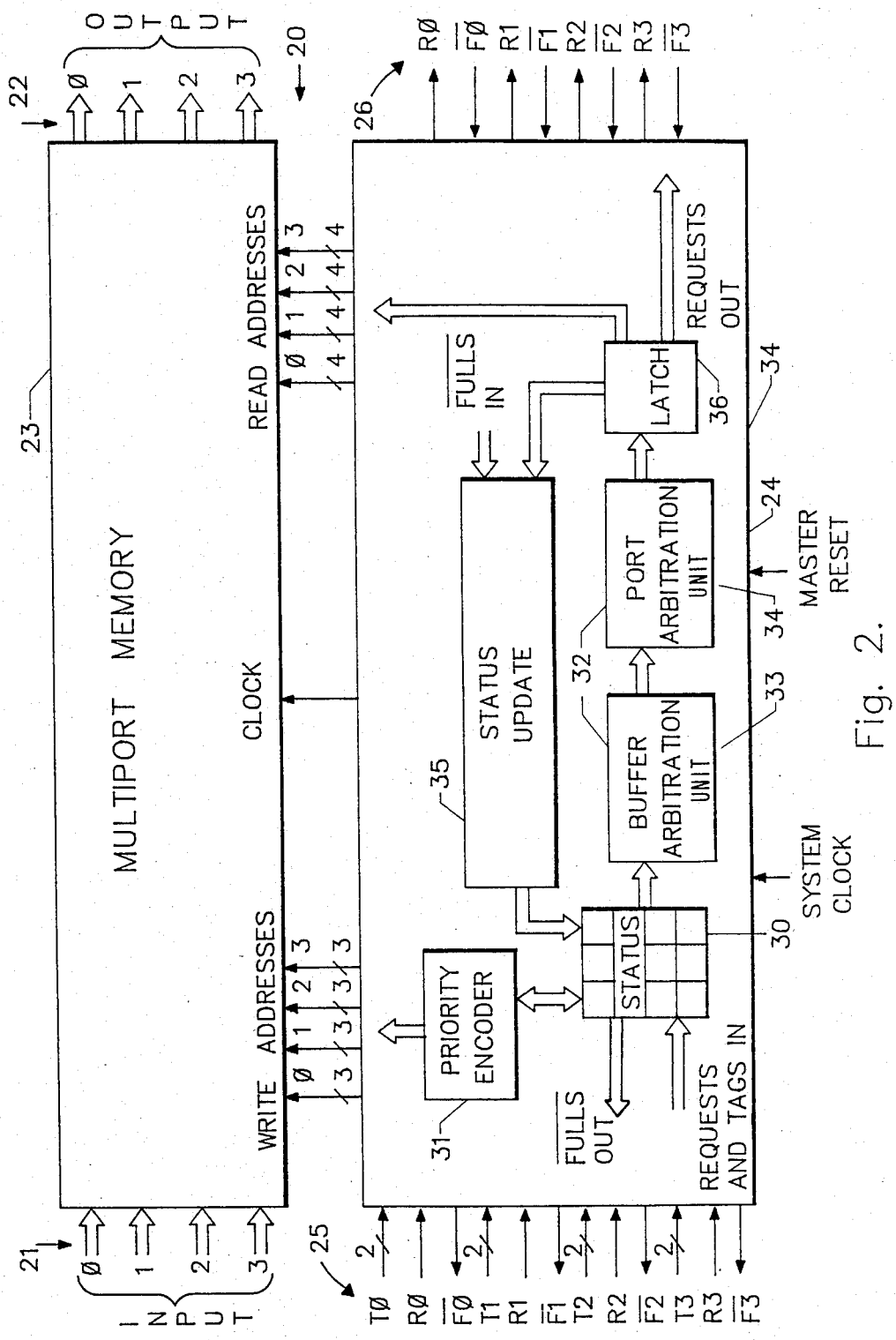
FIG. 2 illustrates a block diagram of a four input, four output implementation of the packet switching node of FIG. 1.
Figure 3A:
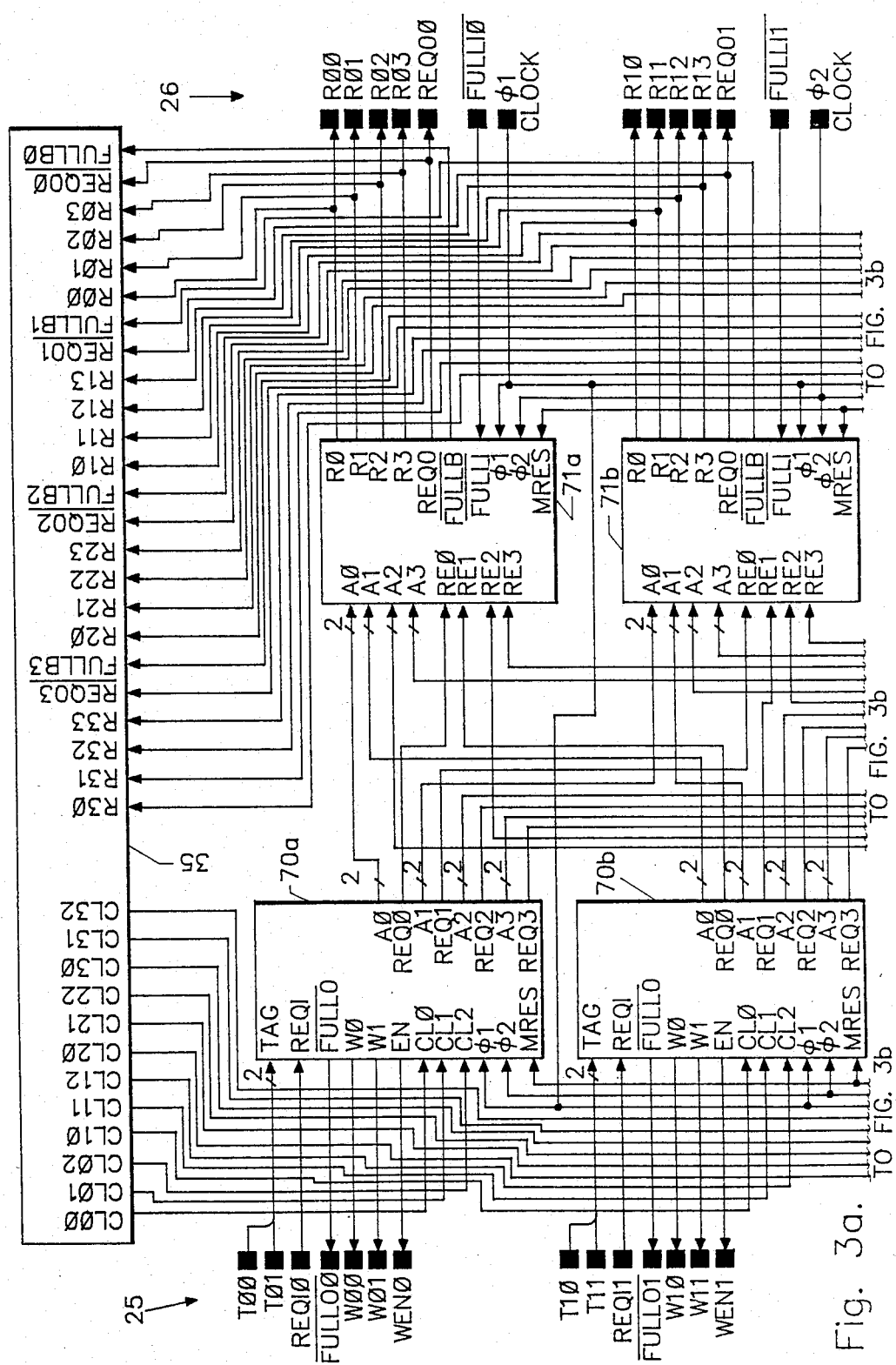
FIGS. 3a and 3b show a detailed block diagram of control logic for use in the packet switching node of FIG. 2.
Figure 3B:
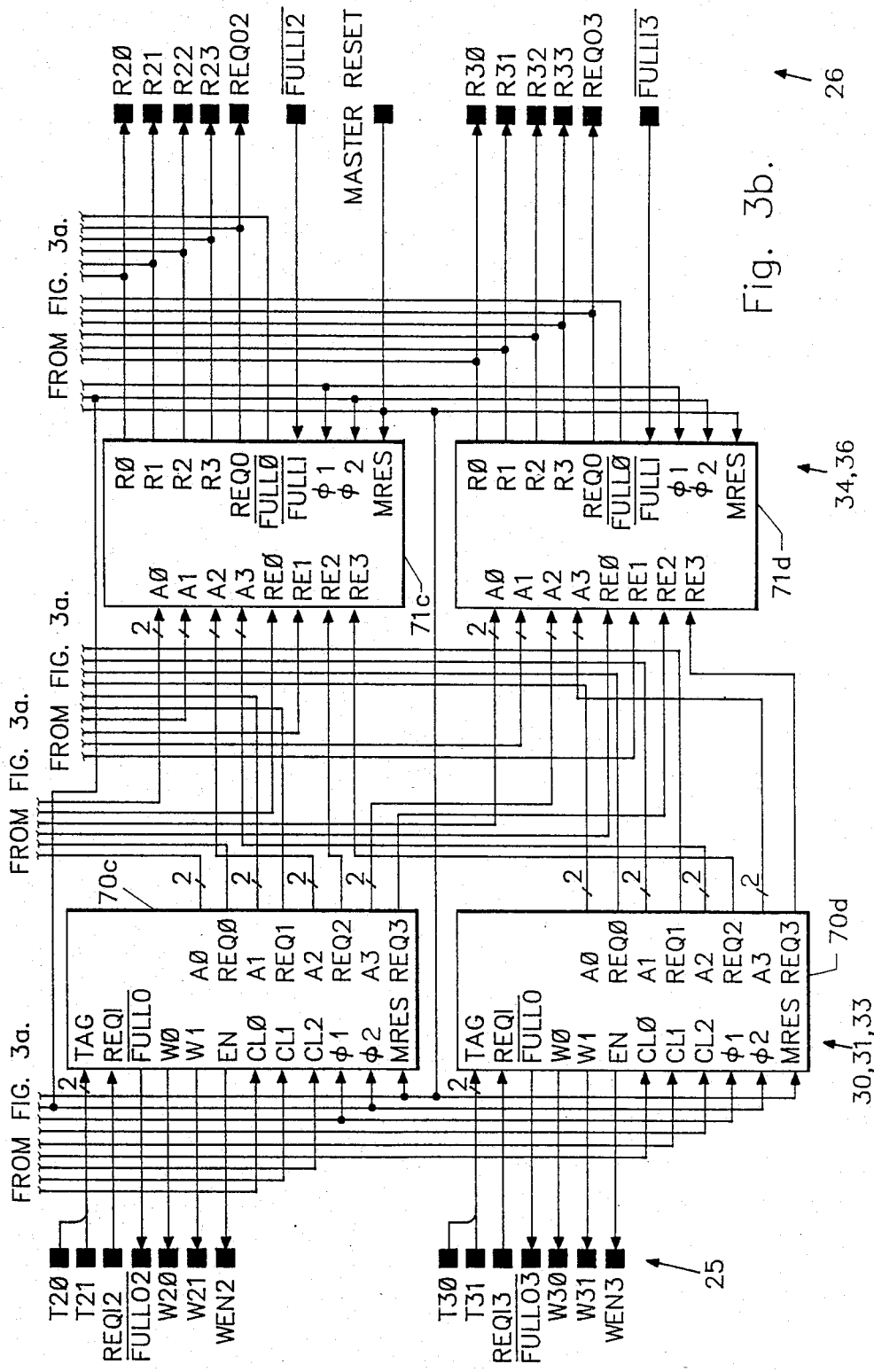

FIG. 2 illustrates a block diagram of the currently preferred embodiment of FIG. 1, in which $N = M = 4$, and which comprises a four by four multiport memory switch node. Referring to FIG. 3, a top-level detailed block diagram of the control logic 24 which may be employed in the packet switching node of FIG. 2 is shown. FIG. 3 shows the interconnection of a plurality of logic blocks which incorporate the status update logic 35, tag status register logic 30, priority encoder logic 31, buffer arbitration logic 33, port arbitration logic 34 and latch logic 36 which comprise the various logic portions of the control logic 24 utilized in the present invention.

The logic circuit shown in FIG. 3 is partitioned so that those portions of the tag status register logic 30, priority encoder logic 31 and buffer arbitration logic 33 associated with one input port 25 are grouped together to form four identical logic modules which comprise four input port logic sections 70a–d. Similarly, those portions of the port arbitration logic 34 and latch logic 36 associated with each output port 26 are grouped together to form four identical logic modules comprising four output port logic sections 71a–d.

Other required signal lines are shown including clock and reset signal lines. Detailed schematics of the various logic portions shown in FIG. 3 are illustrated in FIGS. 4 through 11 hereinbelow. There is a one to one correspondence between the signal line identifiers in FIG. 3 and the signal line identifiers used in the FIGS. 4 through 11. The balance of the Figures will not be discussed in explicit detail except to the extent necessary to explain their operation and function in the overall switch node 20.

Figure 4A:
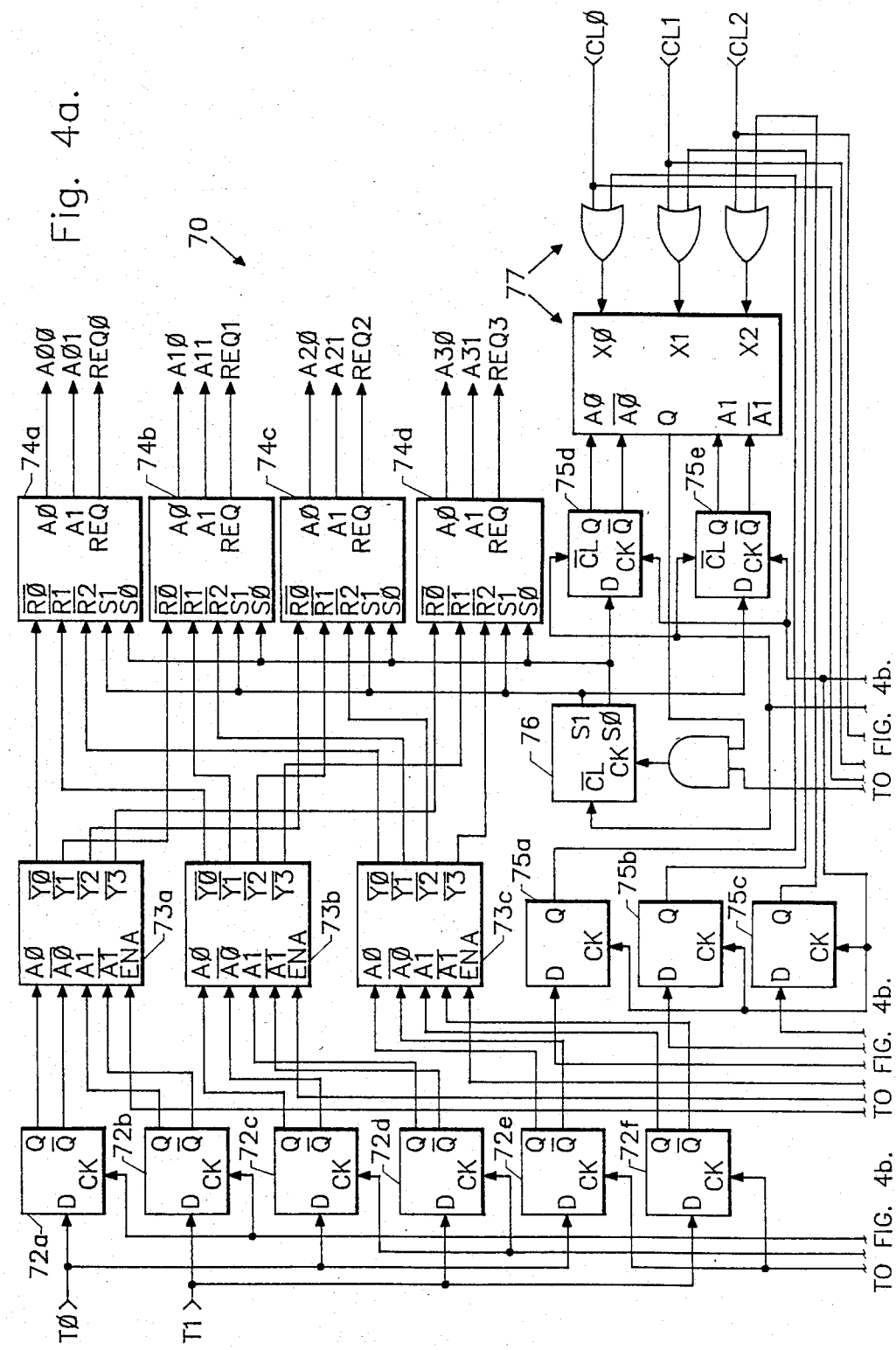
FIGS. 4a and 4b show a design of status, buffer arbitration and priority encoder logic for use in the control logic of FIG. 3.
Figure 4B:
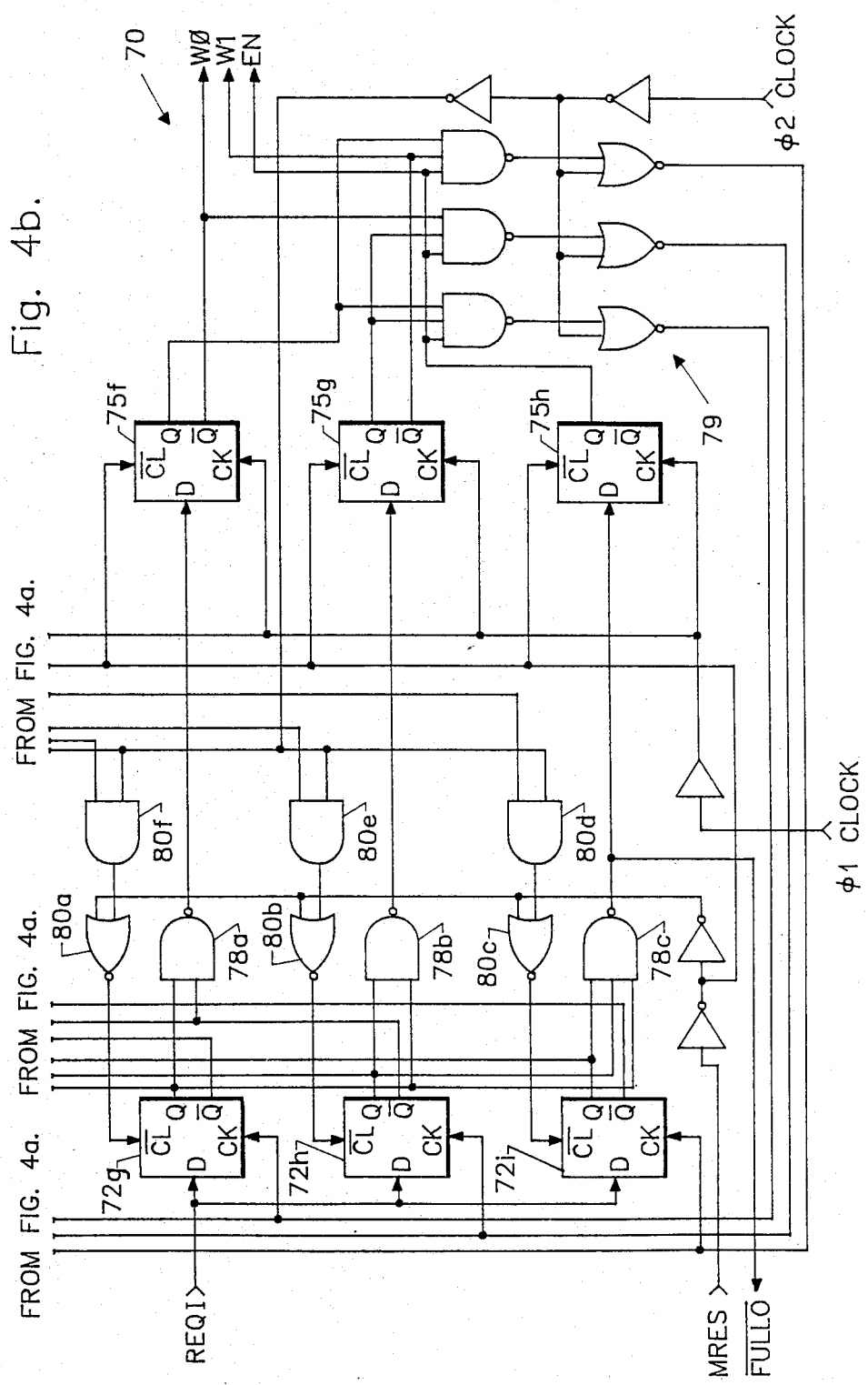

FIG. 4 shows the detailed logic design of one input port section 70. The status register logic 30 comprises nine flip-flops 72a–i which are coupled to tag decoders or demultiplexers 73a–c and the priority encoder logic 31 which employs a plurality of nand gates 78a–c. Decoded tag signals are coupled from the demultiplexers 73 to the buffer arbitration logic 33 which comprises buffer arbitration logic circuits 74a–d. Intermediate status register logic comprising registers 75a–h is used to ensure correct timing of the signals. A modulo 3 counter 76 is employed to determine the current priority used by the buffer arbitration logic circuits 74a–d and is enabled by counter enable logic 77. The priority encoder logic 31 is coupled through the intermediate status register 75f–h to tag status register logic clock enable logic 79. Full/empty flip-flops 72g–i utilized in the tag status register logic 30 are cleared by status reset logic 80.

The logic circuit of FIG. 4 operates as follows. The input port logic section 70a shown in FIG. 4 stores a 2 bit tag and its associated request signal into one of the three locations in the tag status register logic 30 comprising flip-flops 72a–i. The particular storage location is determined by the priority encoder logic 31 comprising nand gates 78 and the clock enable logic 79. The priority encoder logic 31 produces a 2 bit address indicating the first available location and a signal to indicate if there are none. These three signals are also provided to the multiport memory 23 and form the write address for the corresponding input port 21.

The tags that have been stored in the tag status register logic 30 are each decoded by the demultiplexers 73. At most, one signal output from each demultiplexer 73 will be active and will correspond to the desired output port 22. The signal wires from the demultiplexers 73 are physically grouped by corresponding output port 22 and are input to four buffer arbitration logic circuits 74, comprising the buffer arbitration logic 33, with each circuit being associated with a different output port 22. The priority used by each buffer arbitration logic circuit 74 is provided by a modulo 3 counter 76. Each buffer arbitration logic circuit 74 outputs a two bit address of the selected tag and corresponding packet, along with a signal that indicates if any tag desires that output port 22.

The modulo 3 counter 76 is incremented, and hence the priority changes, according to a signal derived from counter enable logic 77. The modulo 3 counter 76 is enabled only if the location with highest priority is empty, as indicated by the tag status register logic full/empty flip-flops 72g–i, or if a clear signal is produced by the status update logic 35 indicating that the packet in the location with highest priority has been transmitted. The clear signals from the status update logic 35 are combined with a master reset signal and a clock signal in status reset logic 80.

Figure 5B:
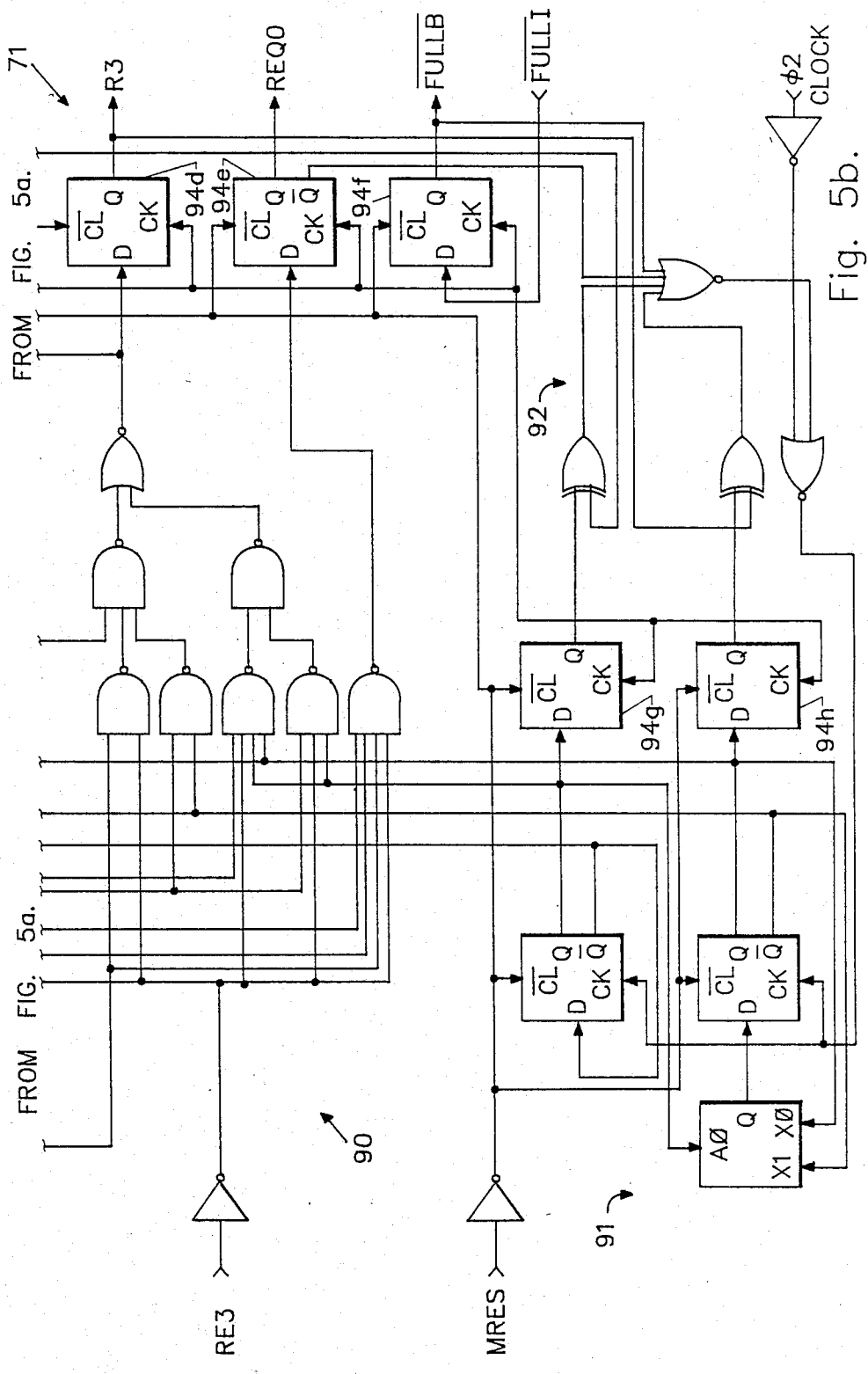

Referring to FIG. 5, there is shown the detailed logic design of an output port logic section 71. The four to one address multiplexers 93a-b and gates 90 which comprise the port arbitration logic 34 are coupled to the latch logic 36 comprising flip-flops 94a-h. The output of the port arbitration logic 34 is also directly coupled to the address multiplexers 93a-b. A modulo 4 counter 91 is coupled to the port arbitration logic 34 and determines the current priority. Counter enable logic 92 controls whether or not the modulo 4 counter 91 is incremented.

In operation, each output port logic section 71 receives one address and request signal from each input port logic section 70, as shown in FIG. 3. The request signals are processed by the port arbitration logic 34 according to the priority indicated by the modulo 4 counter 91. The 2 bit address of the selected input port 21 is output to the latch logic 36 along with a request signal indicating if there is any request. This 2 bit input port address also allows the 4 to 1 address multiplexers 93 to select the corresponding 2 bit status register address from the selected input port 21 which is also output to the latch logic 36. The 4 bits of address from a read address which is coupled to the corresponding output port 22 in the multiport memory 23 to access the packet associated with the selected tag bits.

The modulo four counter 91 is incremented, changing the priority used by the port arbitration logic 34, according to signals from the counter enable logic 92. The counter enable logic 92 produces an increment signal whenever the input port 21 with highest priority has no request for the associated output port 22 or it has a request which is honored and the packet is transmitted. As long as the $\overline{FULLI}$ signal is TRUE, indicating that an output device or switch node attached to the associated output port 22 is "not full," the selected request will be sent. Otherwise the request must wait until the output device is no longer full.

Figure 6B:
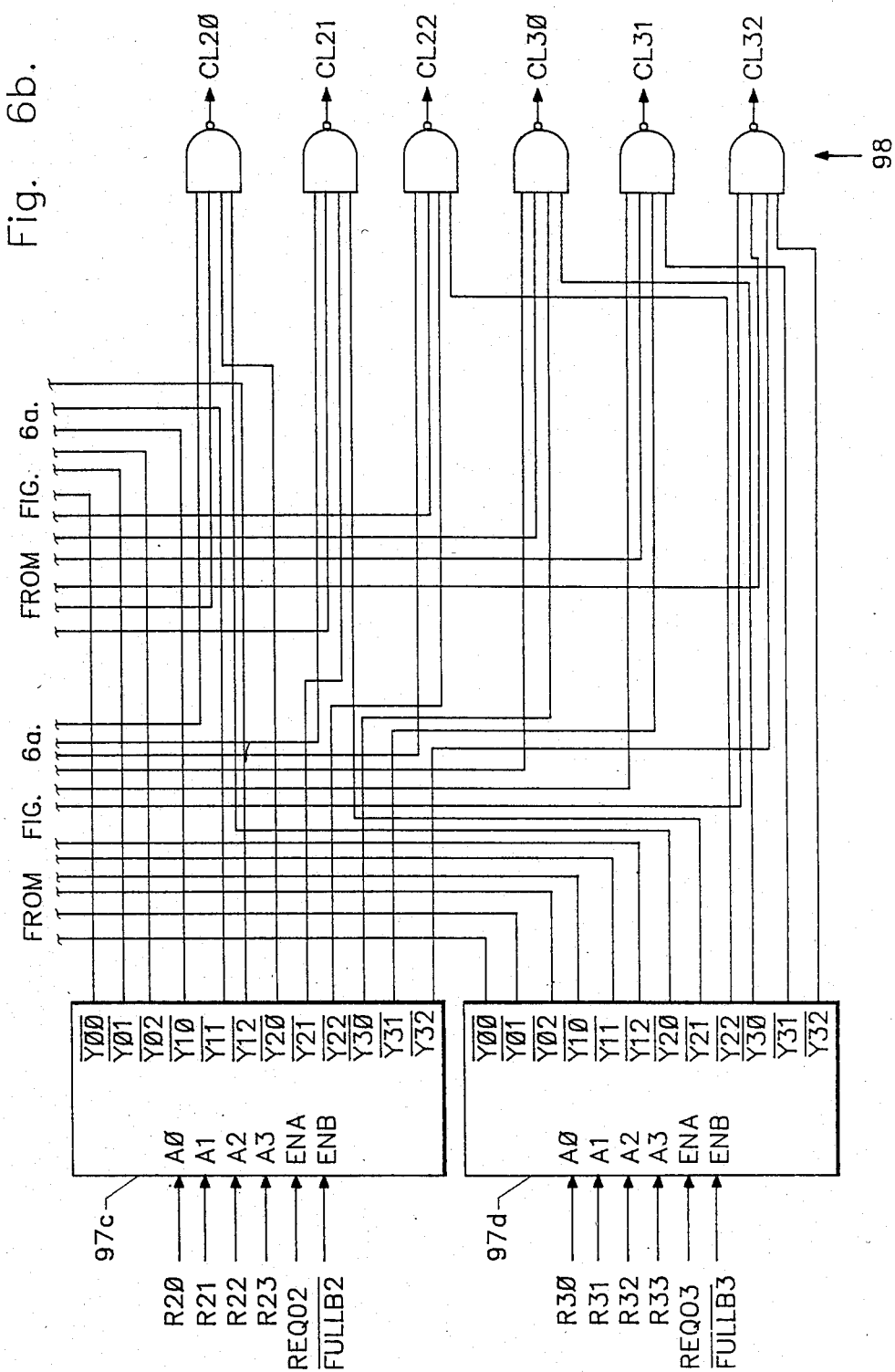

Referring to FIG. 6, there is shown a detailed logic design of the status update logic 35. It is comprised of four identical read address decoders 97a-d which are coupled to clear signal merge logic 98. In operation, each read address decoder 97 enables a single signal, which corresponds to one of 12 status flip-flops in the tag status register logic 30 if there is a request associated with the read address at the input and the "not full" signal is true. The clear signals from all the rear address decoders 97 are merged into a single set of signals which are connected to the status reset logic 80 and the counter enable logic 77 in FIG. 4. There are at most four clear signals active at one time.

Figures 7, 8, 9, 10:
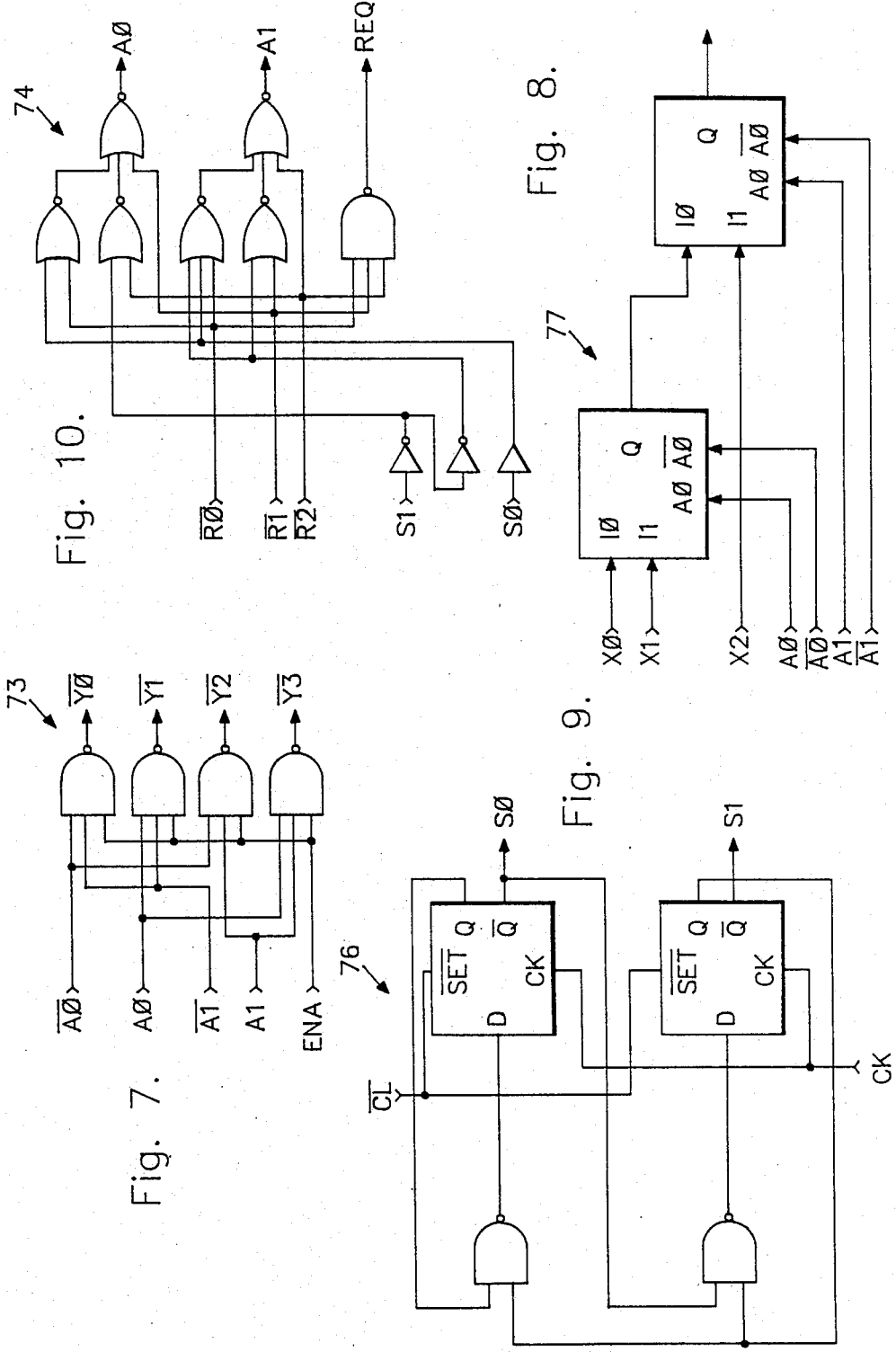
FIG. 7 shows a design of a demultiplexer for use in the buffer arbiration logic of FIG. 4.
FIG. 8 shows a design of a three-to-one multiplexer for use in the buffer arbitration logic of FIG. 4.
FIG. 9 shows a design of a modulo 3 counter for use in the buffer arbitration logic of FIG. 4.
FIG. 10 shows a design of a three input arbitration circuit for use in the buffer arbitration circuit of FIG. 4.
Figure 11:
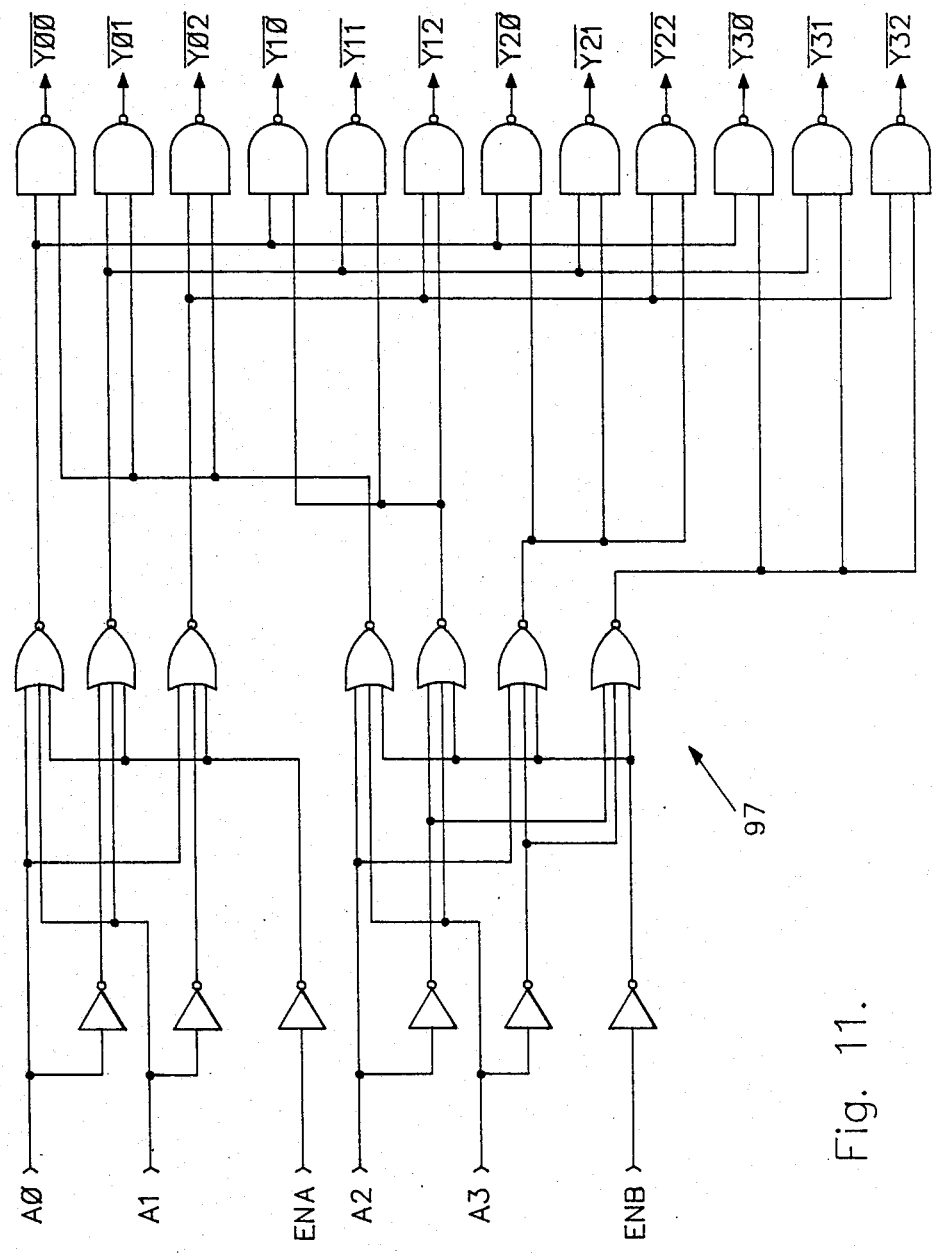
FIG. 11 shows a design of a four-to-twelve demultiplexer circuit for use in the status update logic of FIG. 6.

Referring to FIG. 7, a design of the demultiplexer 73 used in the input port logic 70 of FIG. 4 is shown. FIG. 8 shows a design of the three to one multiplexer 77 used in the input port logic 70 of FIG. 4. FIG. 9 shows a design of the modulo 3 counter 76 used in the input port logic 70 of FIG. 4. FIG. 10 shows a design of the 3 input arbitration logic 74 used in the input port logic 70 of FIG. 4. FIG. 11 shows a design of a four-to-twelve demultiplexer circuit 97 for use in the status update logic 35 of FIG. 6.

Figure 12:
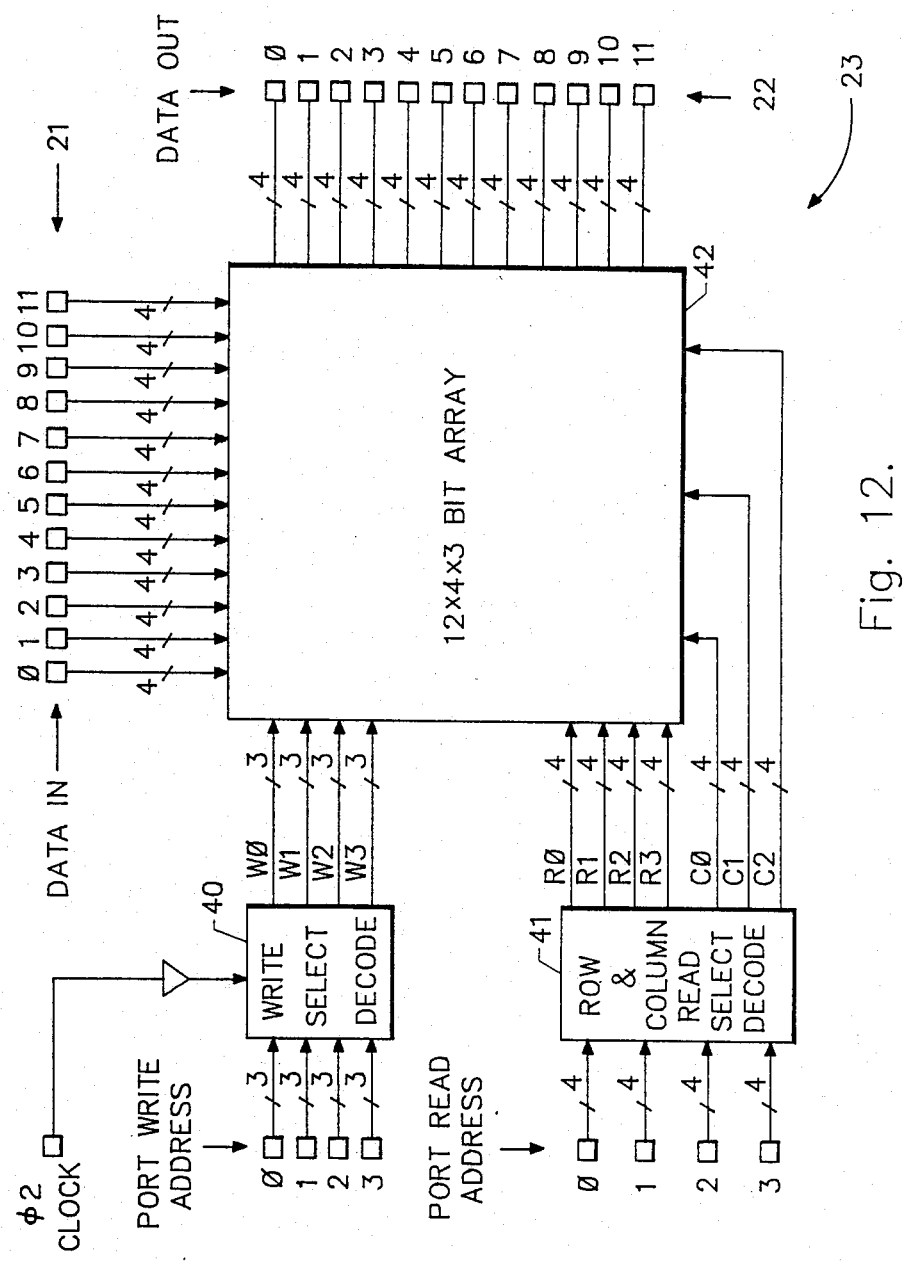
FIG. 12 shows a design of a multiport memory for use in the switch node of FIG. 2.

Referring to FIG. 12 a detailed logic design of the multiport memory 23 is illustrated. The memory 23 is comprised of write address select decode logic 40 and rear address row and column select decode logic 41 which are coupled to a 12×4×3 bit array 42. The multiport memory 23 is designed to accept up to four write addresses and 12 bits which comprise a data packet associated with each write address at an input port 21 and up to four read addresses and produce the four corresponding 12 bit data packets at an output port 22 during each clock cycle. Each write address is decoded in the write address logic 40 so that one of three memory cell select lines is enabled. Each read address is decoded in the read address logic 41 so that one of four row select and one of three column sheet lines is enabled. The memory cell at the intersection of the row and column select lines presents its contents at the corresponding output port 22. Detailed schematics of the various logic blocks shown in FIG. 12 are shown in FIGS. 13 through 18 hereinbelow.

Figure 13A:
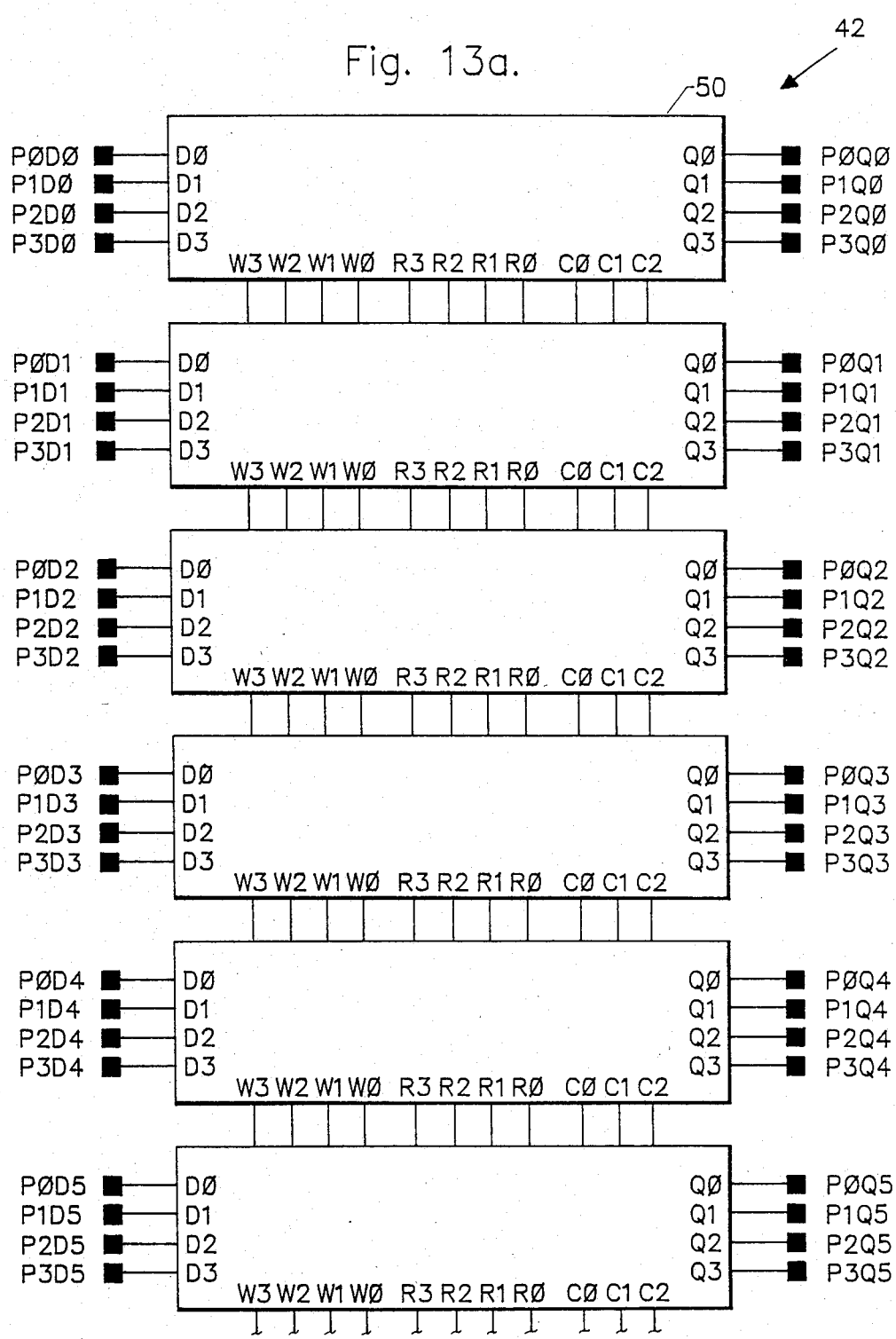
FIGS. 13a and 13b show a design of a 12×4×3 bit array for use in the memory of FIG. 12.
Figure 13B:
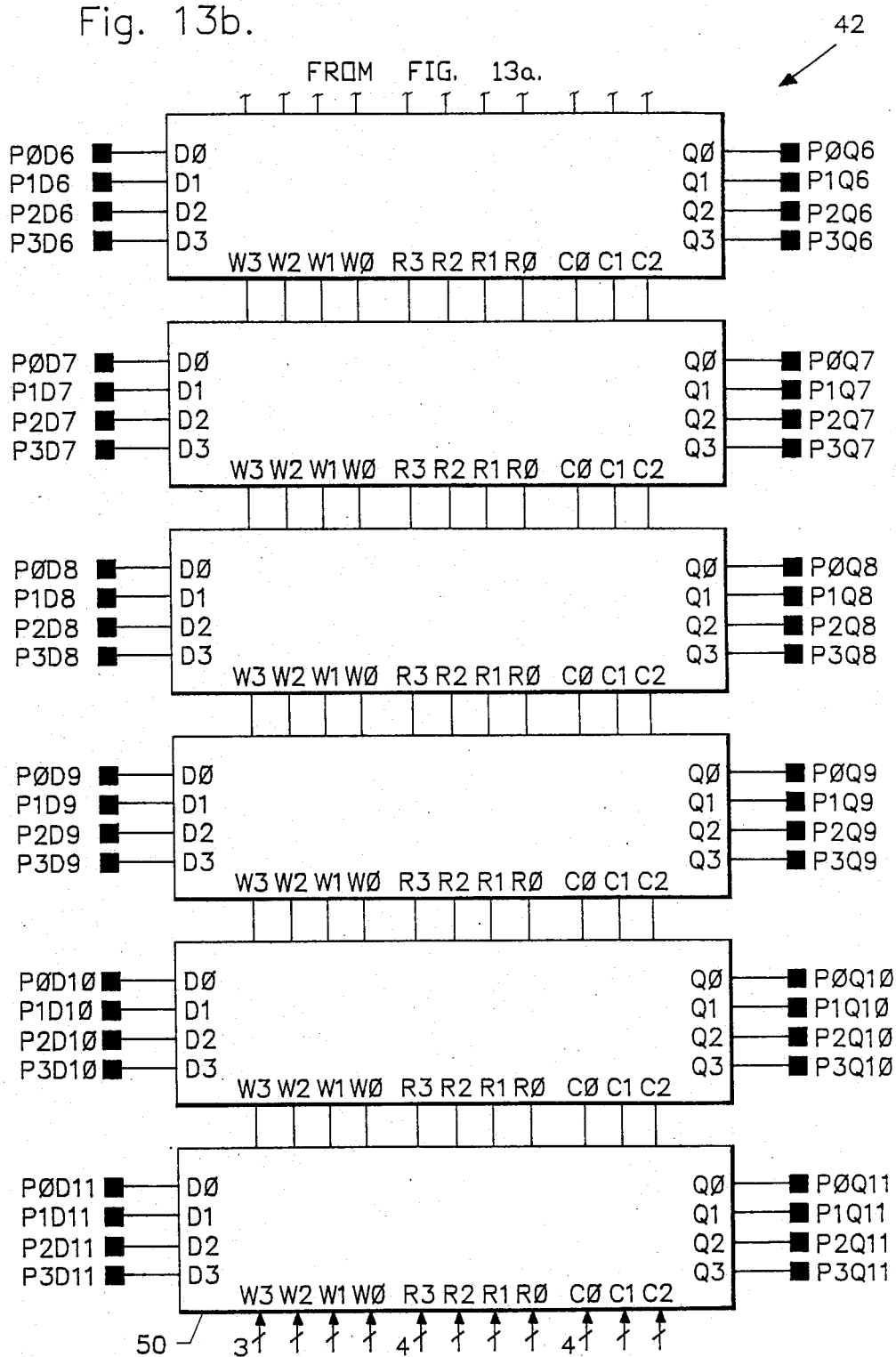
Figure 14A:
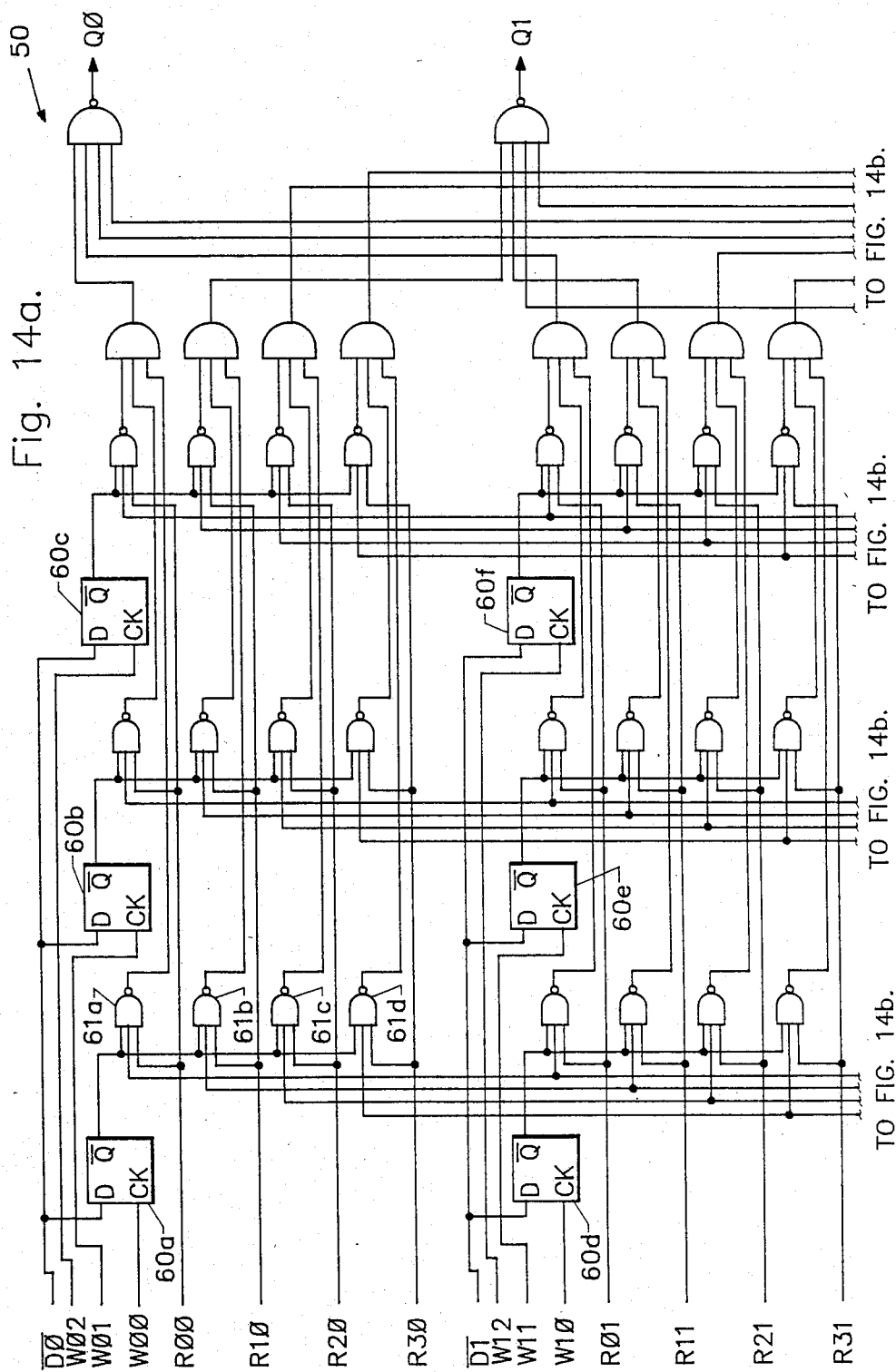
FIGS. 14a and 14b show a design of a 4×3 memory array for use in the bit array of FIG. 13.
Figure 14B:
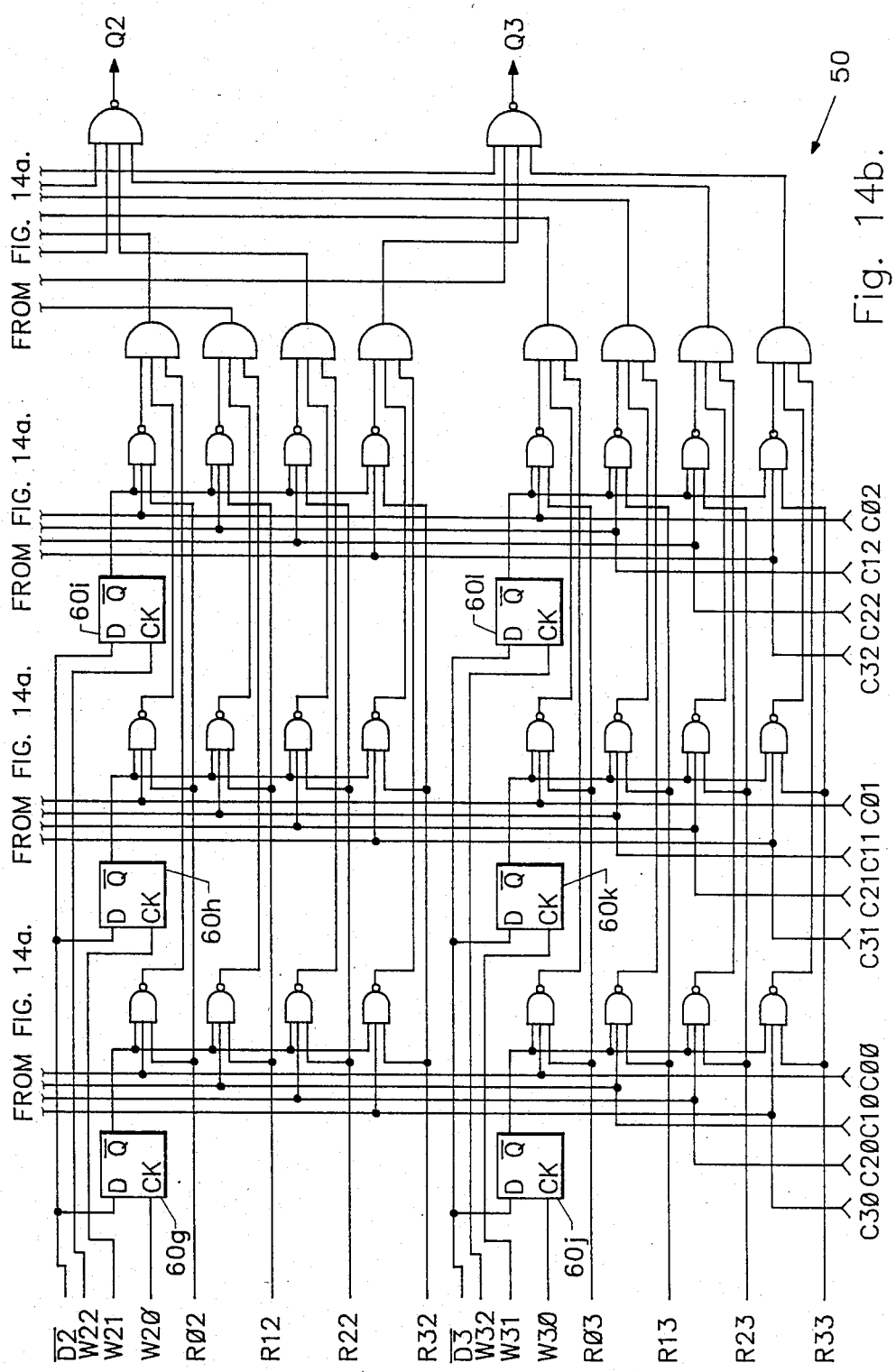

FIG. 13 shows the organization of the 12×4×3 bit array 42. It is comprised of twelve identical copies of a 4×3 bit memory array 50. The write, row, and column select lines are all connected to each 4×3 bit memory array 50. FIG. 14 shows the detailed logic design of the 4×3 memory array 50. Flip-flops 60a-l are used to store one bit of information each. Each input port 21 has an exclusive set of three memory locations into which it can write, which corresponds to three flip-flops that are in the same row, represented by 60a-c, 60d-f, etc. There are four identical copies of memory read flip-flop select logic 61a-d, one for each output port 22, which outputs the value of the bit in the flip-flop 60 corresponding to the intersection of the enabled row and column select lines.

Figure 15:
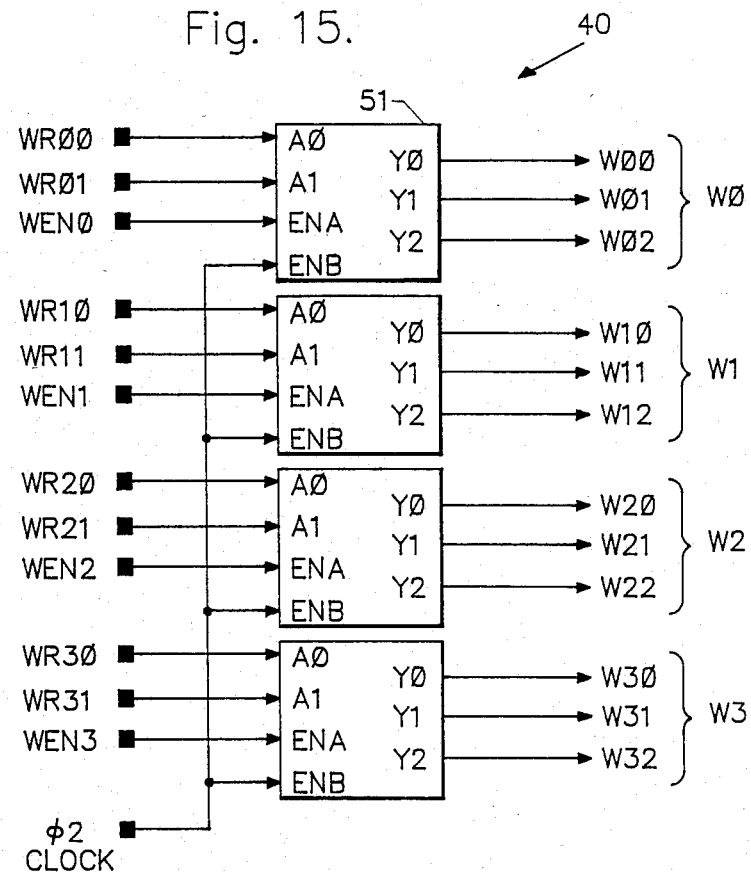
FIG. 15 shows a design of write address select decode logic for use in the memory of FIG. 12.
Figure 16:
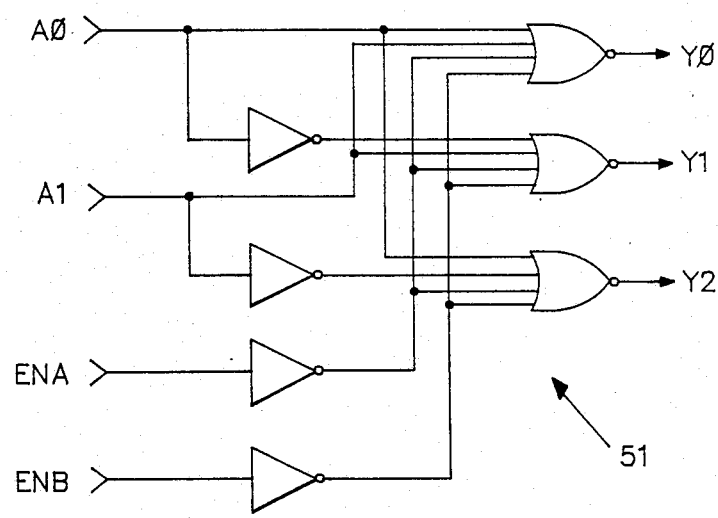
FIG. 16 shows the design of a demultiplexer for use in the logic circuit of FIG. 15.
Figure 17:
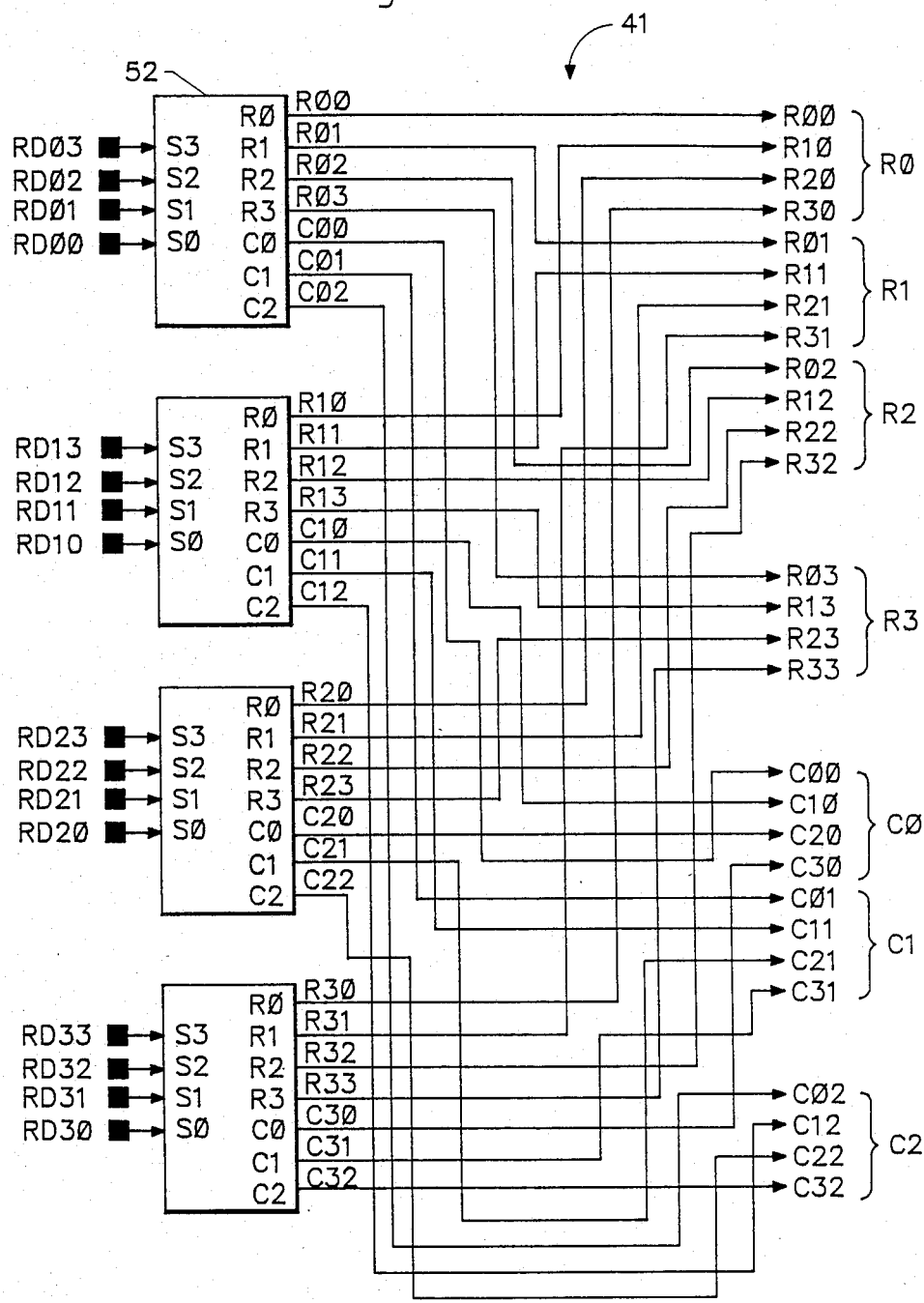
FIG. 17 shows a design of read address row and column select decode logic for use in the memory of FIG. 12.
Figure 18:
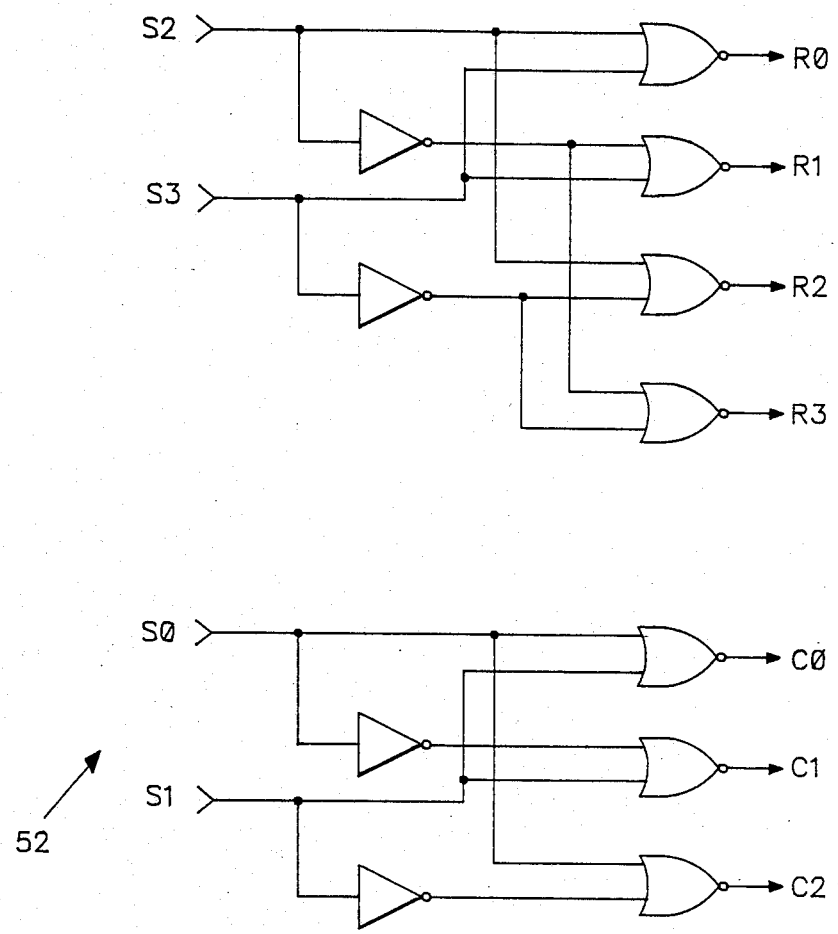
FIG. 18 shows the design of a decoder for use in the logic circuit of FIG. 17.

FIG. 15 shows the detailed design of the write address select decode logic 40 which is comprised of four identical 2 to 3 demultiplexers 51. The detailed logic design of the 2 to 3 demultiplexer 51 is shown in FIG. 16. FIG. 17 shows the detailed design of the read address row and column select decode logic 41 which is comprised of four identical row and column decoders 52. The detailed logic design of a row and column decoder 52 is shown in FIG. 18.

Figure 19:
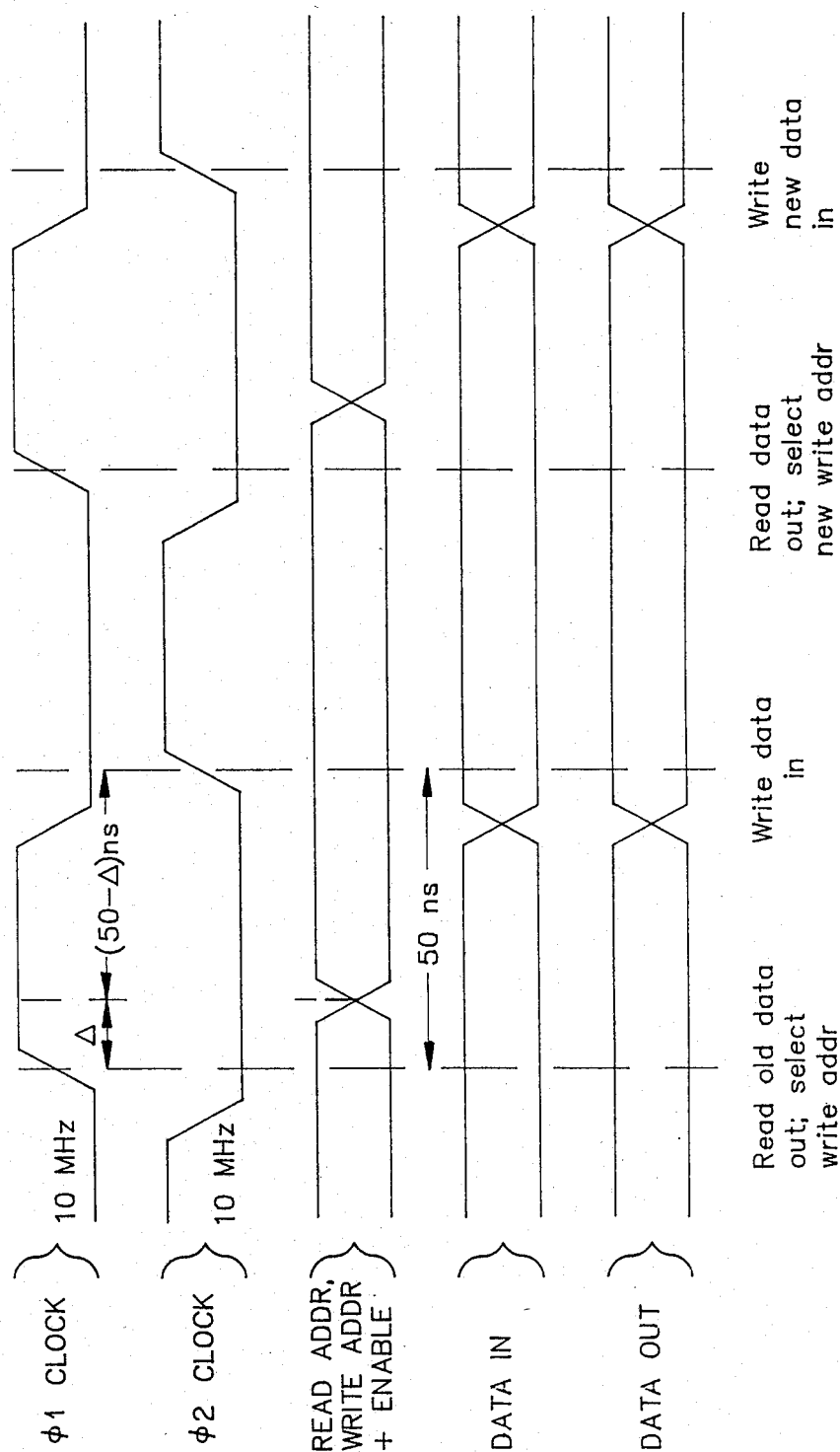
FIG. 19 shows a timing diagram for the switch node of FIG. 2.

FIG. 19 shows a timing diagram for the multiport memory packet switching node 20 of FIG. 2. The system clock, which is externally generated, is comprised of two non-overlapping phases, $\phi 1$ and $\phi 2$. The rising edge of $\phi 1$ initiates the generation of all read and write addresses. Any data packet and its corresponding tag and request signal must be stable prior to the rising edge of $\phi 2$. Upon the rising edge of $\phi 2$, new data packets are written into the multiport memory 23 and the tag status register logic 30 is updated. Conflicts among tags are resolved at this time. The buffer and port priorities are also changed if enabled at this time.

Thus, there has been described a new and improved packet switching node which may be employed as a switch node in a multi-processor or parallel computer application. The packet switching node employs a multiport memory to store and sort data packets based upon the output port destinations thereof. The packet switching node eliminates the problem of contention between data packets arriving at an input port of the node whose destinations are different output ports. The present invention also provides for a packet switching node which has improved performance and higher throughput.

It is to be understood that the above-described embodiments are merely illustrative of some of the many specific embodiments which represent applications of the principles of the present invention. Clearly, numerous and varied other arrangements may be readily devised by those skilled in the art without departing from the spirit and scope of the invention. For example, the present invention is not limited to uses related only to interconnection devices for computers. It also has application in the telecommunications field and may be adapted for use with telecommunications equipment, and the like. In particular, interconnection networks employing the present invention may be used to connect telephone systems that communicate both data and voice information by way of data packets.

What is claimed is:

1. A packet switching node which processes applied data packets containing routing tag signals indicative of the output port destination to which said data packets are to be applied, said packet switching node comprising:
a plurality of input ports;
a plurality of output ports;
a multiport memory coupled between said input and output ports, said memory having a predetermined number of memory locations available for storage of said data packets applied to each of said input ports; and
control logic coupled to said input and output ports and said multiport memory for controlling the storage of data packets in said memory and the routing thereof to said output ports in accordance with said routing tag signals.

2. The packet switching node of claim 1 wherein said control logic comprises:
a status register coupled to said input ports and said memory for storing said routing tag signals and status signals indicative of the full/empty status of each of the memory locations in said memory.

3. The packet switching node of claim 2 wherein said control logic further comprises:
priority encoder logic coupled to said input ports, said memory and said status register for monitoring the full/empty status of said memory locations, writing said routing tag signals into registers of said status register and writing data packets corresponding to said routing tag signals into selected memory locations.

4. The packet switching node of claim 3 wherein said control logic further comprises:
arbitration logic coupled to said status register, said memory and said output ports for reading said data packets from said memory locations and applying them to the output ports identified in the corresponding routing tag signals based upon a predetermined priority arbitration scheme.

5. The packet switching node of claim 4 wherein said arbitration logic further comprises:
buffer arbitration logic which arbitrates among routing tags entering the same input port that contend for output from the same output port and randomly selects a particular routing tag therefrom; and
port arbitration logic coupled to said buffer arbitration logic which arbitrates among all routing tags transmitted by said buffer arbitration logic which contend for the same output port and selects one routing tag therefrom for output from that particular output port.

6. The packet switching node of claim 5 wherein said arbitration logic further comprises:
address generation logic which generates read addresses that control the output of data packets through the appropriate output port for data packets corresponding to those routing tag signals selected by said port arbitration logic.

7. The packet switching node of claim 6 which further comprises:
status update logic which generates signals which reset the full/empty status of the registers corresponding to the data packets applied to any of the output ports.

8. A packet switching node which processes applied data packets containing routing tag signals indicative of the output port destination to which said data packets are to be applied, said packet switching node comprising:
a plurality of input ports;
a plurality of output ports;
a multiport memory coupled between said input and output ports, said memory having a predetermined number of memory locations available for storage of said data packets applied to each of said input ports;
control logic coupled to said input and output ports and said multiport memory for controlling the storage of data packets in said memory and the routing thereof to said output ports in accordance with said routing tag signals, said control logic comprising a storage register for storing said routing tag signals and arbitration logic for determining the output priority of data packets stored in said multiport memory.

9. A packet switching node which processes applied data packets containing routing tag signals indicative of the output port destinations to which said data packets are to be applied, said packet switching node comprising:
a plurality of input ports;
a plurality of output ports;
a multiport memory coupled between said input and output ports, said memory having a predetermined number of memory locations available for storage of said data packets applied to each of said input ports;
a status register for storing said routing tags signals associated with each of said data packets;
buffer arbitration logic coupled to said status register which arbitrates among routing tags corresponding to data packets entering the same input port that contend for output from the same output port and which randomly selects a particular routing tag therefrom; and
port arbitration logic coupled to said buffer arbitration logic which arbitrates among all routing tags transmitted by the buffer arbitration logic whose data packets contend for the same output port and which selects one routing tag therefrom that corresponds to the data packet which is selected for output from that particular output port.

10. A method of processing applied data packets containing routing tag signals indicative of the output port destination to which said data packets are to be applied in order to route said data packets to the appropriate output ports, said method comprising the steps of:
storing said data packets arriving at each of said input ports in predetermined memory locations in accordance with said routing tag signals;
selecting among data packets that have entered the same input port and contend for the same output port;
selecting among data packets that have entered different input ports that contend for the same output port; and
applying said selected data packet to the output port identified in said routing tag signal.

11. A method of processing applied data packets containing routing tag signals indicative of the output port destinations to which said data packets are to be applied in order to route said data packets to the appropriate output ports, said method comprising the steps of:
   sorting said data packets based upon the output port destination thereof contained in said routing tag signals;
   arbitrating among data packets which have entered the same input port and which are destined for the same output port;
   arbitrating among data packets that have entered different input ports and which are destined for the same output port; and
   routing the data packets selected during the two arbitration processes to said output ports identified in said routing tag signals.

12. A method of processing applied data packets containing routing tag signals indicative of the output port destinations to which said data packets are to be applied in order to route said data packets to the appropriate output ports, said method comprising the steps of:
   storing said data packets in predetermined memory locations;
   sorting said data packets based upon the output port destination thereof contained in said routing tag signals;
   arbitrating among those data packets which have entered the same input port and which are destined for the same output port;
   arbitrating among those data packets that have entered different input ports and which are destined for the same output ports; and
   routing the data packets selected during the arbitration process from said memory locations to said output ports identified in said routing tag signals.

* * * * *